US012653260B2

(12) United States Patent
Roy

(10) Patent No.: US 12,653,260 B2
(45) Date of Patent: Jun. 16, 2026

(54) CONNECTABLE HELMET

(71) Applicant: BOMBARDIER RECREATIONAL PRODUCTS INC., Valcourt (CA)

(72) Inventor: Michael Roy, Racine (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/541,278

(22) Filed: Dec. 15, 2023

(65) Prior Publication Data

US 2024/0197020 A1 Jun. 20, 2024

Related U.S. Application Data

(60) Provisional application No. 63/432,893, filed on Dec. 15, 2022.

(51) Int. Cl.

*A42B 3/04* (2006.01)
*A42B 3/00* (2006.01)
*A42B 3/20* (2006.01)
*A42B 3/22* (2006.01)
*A42B 3/28* (2006.01)
*H01R 13/58* (2006.01)

(52) U.S. Cl.

CPC ............ *A42B 3/0406* (2013.01); *A42B 3/006* (2013.01); *A42B 3/205* (2013.01); *A42B 3/227* (2013.01); *A42B 3/283* (2013.01); *H01R 13/5816* (2013.01)

(58) Field of Classification Search

CPC ....... A42B 3/0406; A42B 3/066; A42B 3/221; A42B 3/223

USPC .............................................................. 2/410

See application file for complete search history.

(56) References Cited

U.S. PATENT DOCUMENTS

| | | | | | |
|---|---|---|---|---|---|
| 4,290,150 | A * | 9/1981 | Guerre-Berthelot ... | A42B 3/328 2/424 |
| 4,598,430 | A * | 7/1986 | Nava ...................... | A42B 3/326 2/424 |
| 4,697,289 | A * | 10/1987 | Luigi ..................... | A42B 3/105 2/205 |
| 4,825,475 | A * | 5/1989 | Smart ..................... | A41F 17/04 2/920 |
| 5,412,810 | A * | 5/1995 | Taniuchi .................. | A42B 3/10 2/424 |
| 6,256,797 | B1 * | 7/2001 | Nemoto ................. | A42B 3/328 2/424 |
| 6,854,459 | B1 * | 2/2005 | Cox ....................... | A62B 17/04 2/205 |
| 8,327,465 | B2 * | 12/2012 | Arai ..................... | A42B 3/0473 2/415 |
| 10,602,793 | B1 * | 3/2020 | Williams ........... | A63B 71/1291 |

(Continued)

*Primary Examiner* — Timothy K Trieu

(74) *Attorney, Agent, or Firm* — BCF LLP

(57) ABSTRACT

A helmet including a helmet shell for receiving a head of a wearer, the helmet shell defining therein: a connector chamber, and a connector aperture opening into the connector chamber; the connector chamber being shaped and configured to receive therein an anchor portion of at least one accessory, the at least one accessory being chosen from: a power connector for selectively powering the helmet; a garment for selectively powering the helmet; and a storage fixation for selectively receiving the helmet for storage, the helmet being configured to selectively secure the at least one accessory thereto by receiving the anchor portion of the at least one accessory in the connector chamber.

12 Claims, 33 Drawing Sheets

(56) References Cited

U.S. PATENT DOCUMENTS

| | | | | |
|---|---|---|---|---|
| 11,266,198 | B2 | 3/2022 | Demers et al. | |
| 2010/0263110 | A1* | 10/2010 | Berry | A42B 3/0473<br>2/459 |
| 2012/0278980 | A1* | 11/2012 | Chuback | A41D 13/0512<br>2/461 |
| 2017/0065016 | A1* | 3/2017 | Chuback | A42B 3/0473 |
| 2017/0215510 | A1* | 8/2017 | Demers | A42B 3/222 |

* cited by examiner

CONNECTABLE HELMET

CROSS-REFERENCE

The present application claims priority to U.S. Provisional Patent Application No. 63/432,893, entitled "Connectable Helmet," filed Dec. 15, 2022, the entirety of which is incorporated by reference herein.

FIELD OF TECHNOLOGY

The present technology relates to helmets and specifically helmets connectable for storage or power.

BACKGROUND

Helmets are a form of protective equipment used to protect the head of a wearer, including for riders for two- and three-wheeled vehicles and off-road vehicles. Helmets vary largely depending on their application. Indeed, there is a large array of activities that require head protection and so helmets are customized to best fit the activities' requirements. For instance, there are full-face helmets, off-road helmets, or open face helmets to name a few types of helmets.

Some helmets are electrified, with one or more electric components installed therein. Such electrical components could be accessories such as heated visors, communication systems, flashlights, etc. Electrical power is generally required to be delivered to such a helmet, usually by a power cord connected thereto. In some cases, the wearer of the helmet may need to remove the power cord and reconnect the power cord regularly (either from the helmet or from the power source). Depending on the arrangement of the cord and the helmet, this process could be cumbersome for the wearer.

There remains a desire for solutions for helmets receiving power.

SUMMARY

It is an object of the present technology to ameliorate at least some of the inconveniences present in the prior art.

According to an aspect of the present technology, there is provided a family of helmets configured for being stored or being provided electrical power. Each helmet has a helmet shell defining a chamber and aperture connecting to the chamber therein. The chamber has an electrical contact disposed therein. The aperture and chamber are arranged to receive therein a storage anchor, a power cord connection, and/or a power connector from a garment. The power cord and the garment each include an anchor (or connector) shaped to be inserted into the chamber of the helmet shell, with an electrical contact on the anchor being arranged to electrically connect to the electrical contact of the helmet. The storage anchor is similarly shaped to be inserted into the same aperture and chamber. The helmet shell can be connected to the storage anchor by rotating a quarter-turn about the storage anchor when inserted in the chamber. In at least some embodiments, the aperture and the storage anchor are arranged such that when connected to a wall (or similar), the helmet is in a connected position when hanging from the hook, with gravity biasing the helmet toward the connected position. Specifically, the chamber is defined in a rear portion of the helmet shell, and a front side of the helmet is facing downward in the connected position.

According to an aspect of the present technology, there is provided a helmet including: a helmet shell for receiving a head of a wearer, the helmet shell defining therein: an anchor chamber configured to receive an anchor lock therein; and an anchor aperture opening into the anchor chamber configured to selectively permit passage of the anchor lock therethrough, the helmet being adapted for selectively connecting to a storage fixation comprising the anchor lock, the helmet being rotatable relative to the anchor lock of the storage fixation between an unlocked position and a locked position, in the unlocked position, the anchor aperture being free to pass over the anchor lock, the helmet being selectively removeable from the storage fixation in the unlocked position, in the locked position, the anchor lock being disposed in the anchor chamber and being prevented by the helmet shell from passing through the anchor aperture, the helmet being rotated to move the anchor aperture relative to the anchor lock between the unlocked position and the locked position, the helmet being selectively secured to the storage fixation by inserting the anchor lock into the anchor chamber by moving the helmet relative to the storage fixation and rotating the helmet to place the anchor lock in the locked position.

In some embodiments, the helmet shell includes: a crown portion, and a bottom trim disposed opposite the crown portion; the anchor aperture is defined in a bottom surface of the bottom trim; and the anchor chamber is defined at least partially in the bottom trim.

In some embodiments, the connector aperture is defined in a rear portion of the bottom surface.

In some embodiments, a first dimension of the anchor aperture extends along a left-right axis of the helmet shell; a second dimension of the anchor aperture extends along a forward-rearward axis of the helmet shell, the second dimension being orthogonal to the first dimension; and the first dimension is greater than the second dimension.

In some embodiments, the anchor aperture is generally hexagonal.

In some embodiments, when the helmet is selectively connected to the storage fixation and the helmet is oriented in the locked position, the helmet is in a gravitationally stable position.

In some embodiments, the anchor chamber is laterally offset from a center of gravity of the helmet; and when the anchor lock is selectively inserted into the anchor chamber and the helmet is oriented in a position intermediate the unlocked position and the locked position, the helmet is biased toward the locked position by gravity.

In some embodiments, the helmet moves between the locked position and the unlocked position by pivoting about the anchor lock of the storage fixation.

In some embodiments, the anchor chamber is disposed in a rear portion of the helmet shell.

In some embodiments, when the helmet is selectively connected to the storage fixation and the helmet is oriented in the locked position, a rear of the helmet is positioned generally vertically above a front of the helmet, the helmet being in a gravitationally stable position.

According to another aspect of the present technology, there is provided a helmet including a helmet shell for receiving a head of a wearer, the helmet shell defining therein: a connector chamber, and a connector aperture opening into the connector chamber; at least one electrical device attached to the helmet shell; at least one electrical contact disposed in the connector chamber, the at least one electrical contact being electrically connected to the at least one electrical device, the at least one electrical contact being adapted for electrically coupling to a helmet power connector, the helmet power connector being configured for electrically connecting to a power source, the connector chamber being shaped and configured to receive therein an anchor portion of the helmet power connector; and at least one magnet disposed on the helmet shell in a vicinity of the connector aperture, the at least one magnet being configured to selectively magnetically connect at least one connector magnet of the helmet power connector, the helmet being configured to selectively secure the helmet power connector thereto by aligning the at least one magnet of the helmet with the at least one connector magnet of the helmet power connector and receiving the anchor portion of the helmet power connector in the connector chamber, when in use with the helmet receiving the anchor portion of helmet power connector in the connector chamber, the at least one electrical contact being electrically coupled to at least one power electrical contactor disposed on the anchor portion, an electrical connection location between the helmet and the helmet power connector being disposed within the connector chamber and at least partially surrounded by the helmet shell.

In some embodiments, the power source is a battery for a vehicle.

In some embodiments, the helmet shell includes: a crown portion, and a bottom trim disposed opposite the crown portion; the connector aperture is defined in a bottom surface of the bottom trim; and the connector chamber is defined at least partially in the bottom trim.

In some embodiments, the connector aperture is defined in a rear portion of the bottom surface.

In some embodiments, the at least one magnet is disposed on the bottom surface of the bottom trim.

In some embodiments, the at least one magnet includes: a first magnet disposed on a first side of the connector aperture; and a second magnet disposed on a second side of the connector aperture, the second side being opposite the first side.

In some embodiments, the helmet further including a plurality of garment securing magnets disposed in the bottom trim of the helmet shell, the plurality of garment securing magnets being configured and arranged to selectively magnetically connect to magnets of a collar portion of a garment, the garment including the helmet power connector.

In some embodiments, a first dimension of the connector aperture extends along a left-right axis of the helmet shell; a second dimension of the connector aperture extends along a forward-rearward axis of the helmet shell, the second dimension being orthogonal to the first dimension; and the first dimension is greater than the second dimension.

In some embodiments, the connector aperture is generally hexagonal.

In some embodiments, the at least one electrical contact includes: a positive electrical contact configured to connect to a positive connector contact of the helmet power connector, and a negative electrical contact configured to connect to a negative connector contact of the helmet power connector.

In some embodiments, the helmet is further adapted for selectively connecting to a storage fixation comprising an anchor lock; the connector chamber is further configured to receive the anchor lock therein; the connector aperture is further configured to selectively permit passage of the anchor lock therethrough; when the helmet is positioned such that the anchor lock is received in the connector chamber, the helmet is rotatable relative to the storage fixation between an unlocked position and a locked position, in the unlocked position, the connector aperture being free to pass over the anchor lock, the helmet being selectively removeable from the storage fixation in the unlocked position, in the locked position, the anchor lock being disposed in the connector chamber and being prevented by the helmet shell from passing through the connector aperture; the helmet is rotated to move the anchor aperture relative to the anchor lock between the unlocked position and the locked position.

In some embodiments, the helmet is selectively secured to the storage fixation by inserting the anchor lock into the connector chamber by moving the helmet relative to the storage fixation and rotating the helmet to the locked position.

In some embodiments, when the helmet is selectively connected to the storage fixation and the helmet is oriented in the locked position, the helmet is in a gravitationally stable position.

In some embodiments, the connector chamber is laterally offset from a center of gravity of the helmet; and when the anchor lock is selectively inserted into the connector chamber and the helmet is oriented in a position intermediate the unlocked position and the locked position, the helmet is biased toward the locked position by gravity.

In some embodiments, the helmet moves between the locked position and the unlocked position by pivoting about the anchor lock of the storage fixation.

In some embodiments, the helmet shell includes: a crown portion, and a bottom trim disposed opposite the crown portion; the connector aperture is defined in a bottom surface of the bottom trim; and the connector chamber is defined at least partially in the bottom trim.

In some embodiments, the connector chamber is disposed in a rear portion of the helmet shell.

In some embodiments, the helmet is further adapted for selectively connecting to a garment for selectively receiving electrical power therefrom, the connector chamber being adapted to receive therein a collar anchor portion extending from a collar portion of a garment, the garment including the helmet power connector.

According to yet another aspect of the present technology, there is provided a helmet including a helmet shell for receiving a head of a wearer, the helmet shell defining therein: a connector chamber, and a connector aperture opening into the connector chamber; the connector chamber being shaped and configured to receive therein an anchor portion of at least one accessory, the at least one accessory being chosen from: a power connector for selectively powering the helmet; a garment for selectively powering the helmet; and a storage fixation for selectively receiving the helmet for storage, the helmet being configured to selectively secure the at least one accessory thereto by receiving the anchor portion of the at least one accessory in the connector chamber.

According to another aspect of the present technology, there is provided a power connector for providing power to an accessory, the power connector including a first end portion configured for electrically connecting to the accessory, the first end portion including a connector body, at least one connector magnet disposed on the connector body, at least one connector magnet being configured to selectively magnetically connect at least one magnet of the accessory, an anchor portion extending from the connector body, and at least one connector electrical contact disposed on the anchor portion, the anchor portion being shaped and configured to enter a connector chamber defined in the accessory; a cord portion electrically connected to the first end portion; and a second end portion electrically connected to the cord portion, the second end being configured to electrically connect to a power source, the power connector being configured to be selectively secured to the accessory by aligning the at least one connector magnet with the at least one magnet of the accessory and inserting the anchor portion into the connector chamber of the accessory.

In some embodiments, the at least one connector electrical contact includes: a positive electrical contact configured to connect to a positive accessory contact of the accessory, and a negative electrical contact configured to connect to a negative accessory contact of the accessory.

According to yet another aspect of the present technology, there is provided a helmet storage system including a helmet comprising a helmet shell for receiving a head of a wearer, the helmet shell defining therein: an anchor chamber, and an anchor aperture opening into the anchor chamber; and a storage fixation configured for selectively receiving the helmet thereon, the storage fixation including a fixation body configured to be connected to a generally flat surface, and an anchor lock, the anchor lock being configured to be inserted through the anchor aperture and into the anchor chamber of the helmet shell, the helmet being rotatable relative to the anchor lock between an unlocked position and a locked position, in the unlocked position, the anchor lock being free to pass through the anchor aperture, the helmet being selectively removeable from the storage fixation in the unlocked position, in the locked position, the anchor lock being disposed in the anchor chamber and being prevented by the helmet shell from passing through the anchor aperture, the helmet being rotated to move the anchor aperture relative to the anchor lock between the unlocked position and the locked position, the helmet being selectively secured to the storage fixation by inserting the anchor lock into the anchor chamber by moving the helmet relative to the storage fixation and rotating the helmet to place the anchor lock in the locked position.

In some embodiments, the fixation body has a first surface arranged to contact the generally flat surface when connected thereto; the anchor lock extends from a second surface of the fixation body, the second surface being disposed opposite the first surface; and the anchor lock is spaced from the second surface.

In some embodiments, the storage fixation further comprises a stem extending from the fixture body, the anchor lock extending from the stem.

In some embodiments, the anchor lock comprises two cams extending from opposite sides of the stem.

In some embodiments, the generally flat surface is a vertically extending flat surface; and when the storage fixation is connected to the vertically extending flat surface, the two cams extend generally vertically from the stem.

In some embodiments, when the helmet is selectively connected to the storage fixation and the helmet is oriented such that the anchor lock is in the locked position, the helmet is in a gravitationally stable position.

In some embodiments, the helmet shell includes: a crown portion, and a bottom trim disposed opposite the crown portion; the anchor aperture is defined in a bottom surface of the bottom trim; and the anchor chamber is defined at least partially in the bottom trim.

In some embodiments, when the helmet is selectively secured to the storage fixation, the bottom surface of the bottom trim is arranged facing the fixation body.

In some embodiments, a first dimension of the anchor aperture extends along a left-right axis of the helmet shell; a second dimension of the anchor aperture extends along a forward-rearward axis of the helmet shell, the second dimension being orthogonal to the first dimension; and the first dimension is greater than the second dimension.

In some embodiments, the anchor aperture is generally hexagonal.

According to another aspect of the present technology, there is provided a storage fixation configured for selectively receiving a helmet thereon, the storage fixation including a fixation body configured to be connected to a generally flat surface, and an anchor lock, the anchor lock being configured to be inserted through an anchor aperture and into an anchor chamber of the helmet, the helmet being rotatable relative to the anchor lock between an unlocked position and a locked position, in the unlocked position, the anchor lock being free to pass through the anchor aperture, the helmet being selectively removeable from the storage fixation in the unlocked position, in the locked position, the anchor lock being disposed in the anchor chamber and being prevented by a helmet shell of the helmet from passing through the anchor aperture, the helmet being rotated to move the anchor aperture relative to the anchor lock between the unlocked position and the locked position, the helmet being selectively secured to the storage fixation by inserting the anchor lock into the anchor chamber by moving the helmet relative to the storage fixation and rotating the helmet to place the anchor lock in the locked position.

In some embodiments, a fastener aperture is defined in the fixation body for receiving a fastener therethrough; and when in use, the fastener disposed through the fastener aperture connects the storage fixation to the generally flat surface.

In some embodiments, the anchor lock is offset from the fastener aperture.

In some embodiments, the anchor lock is offset from a center of the fixation body.

In some embodiments, the fixation body has a first surface arranged to contact the generally flat surface when connected thereto; the anchor lock is connected to a second surface of the fixation body, the second surface being disposed opposite the first surface; and the anchor lock is spaced from the second surface.

In some embodiments, storage fixation further including a stem extending from the fixture body, the anchor lock extending from the stem.

In some embodiments, the anchor lock comprises two cams extending from opposite sides of the stem.

In some embodiments, the generally flat surface is a vertically extending flat surface; and when the storage fixation is connected to the vertically extending flat surface, the two cams extend generally vertically from the stem.

In some embodiments, when the helmet is selectively secured to the storage fixation, the second surface of the fixation body generally faces a bottom surface of the helmet.

For purposes of this application, terms related to spatial orientation such as front, rear, top, bottom, left, and right, are as they would normally be understood by a user of the object described, as oriented in standard usage. Terms related to spatial orientation when describing or referring to components or sub-assemblies of the helmet, separately from the helmet should be understood as they would be understood when these components or sub-assemblies are mounted to the helmet, unless specified otherwise in this application.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Unless noted otherwise, figures may not be drawn to scale.

DETAILED DESCRIPTION

Figure 1:
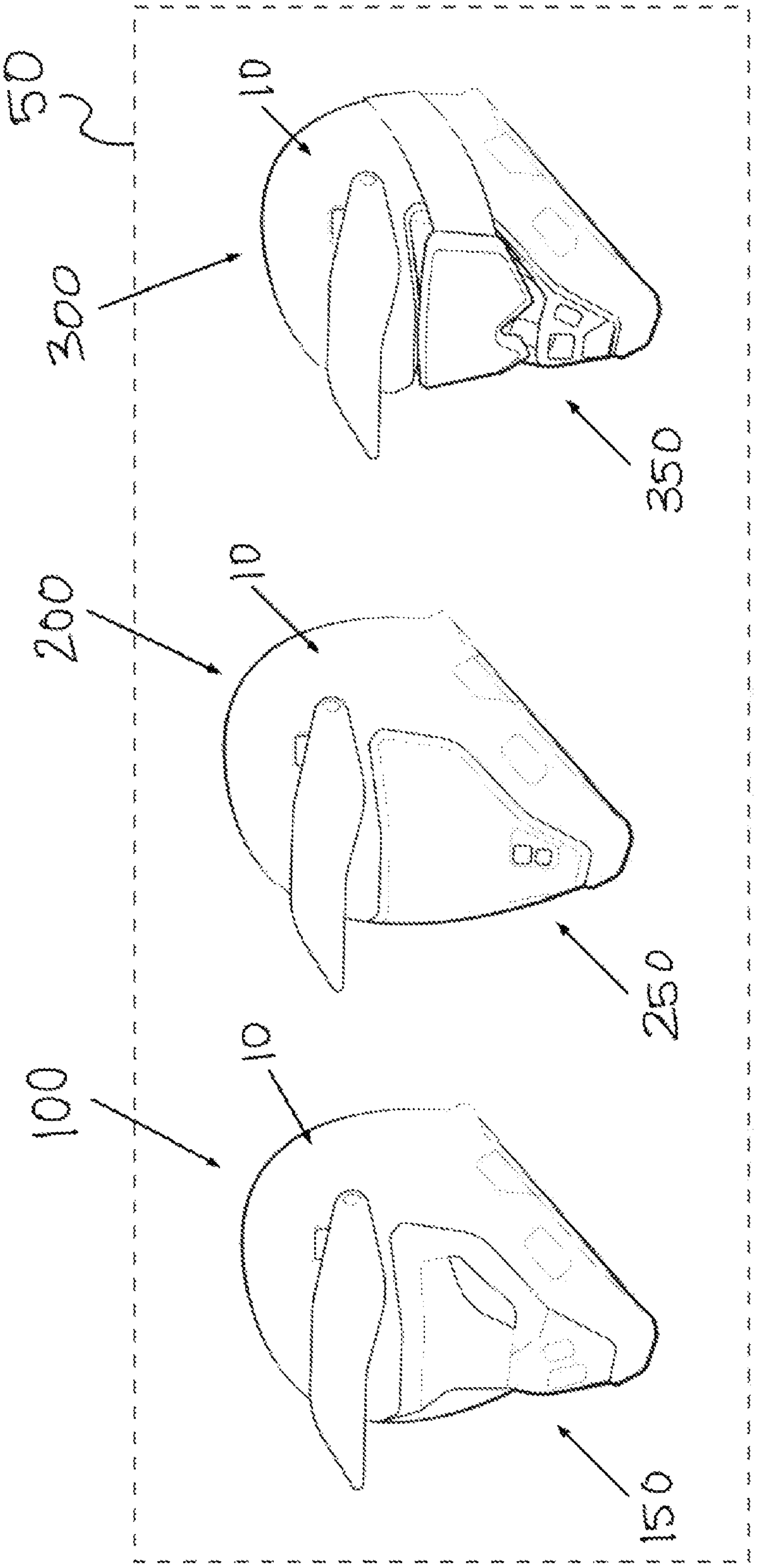
FIG. 1 is a perspective view of a family of helmets according to one non-limiting embodiment of the present technology.

The present application relates to a family 50 of helmets used to protect a head of a wearer, illustrated in FIG. 1. The family 50 of helmets includes three types of helmets according to the present non-limiting embodiment. Specifically, the family 50 of helmets includes a cold weather adapted helmet 100, a high vision helmet 200, and a motocross style helmet 300. While three types of helmets are described herein, it is contemplated that alternative or additional helmets or helmet types could be part of the family 50.

Figure 2:
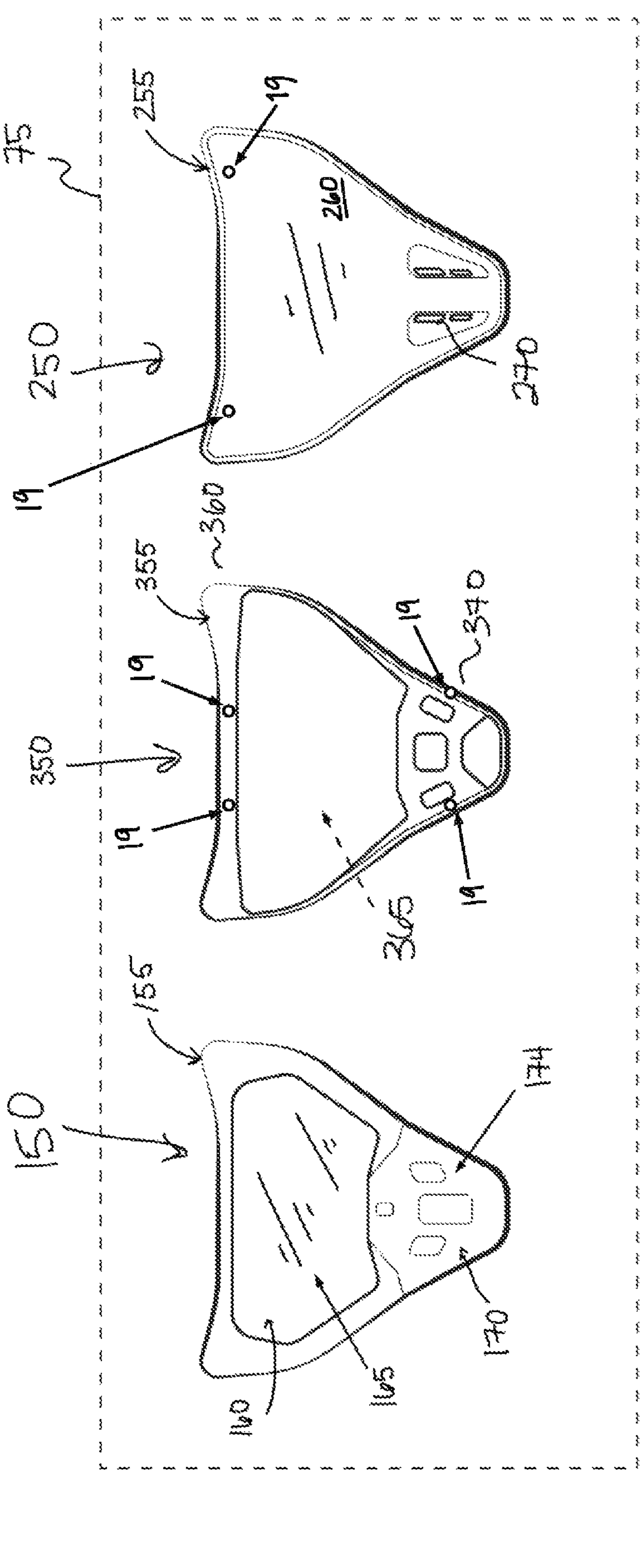
FIG. 2 is a front elevation view of a family of masks for forming the family of helmets of FIG. 1.
Figure 3:
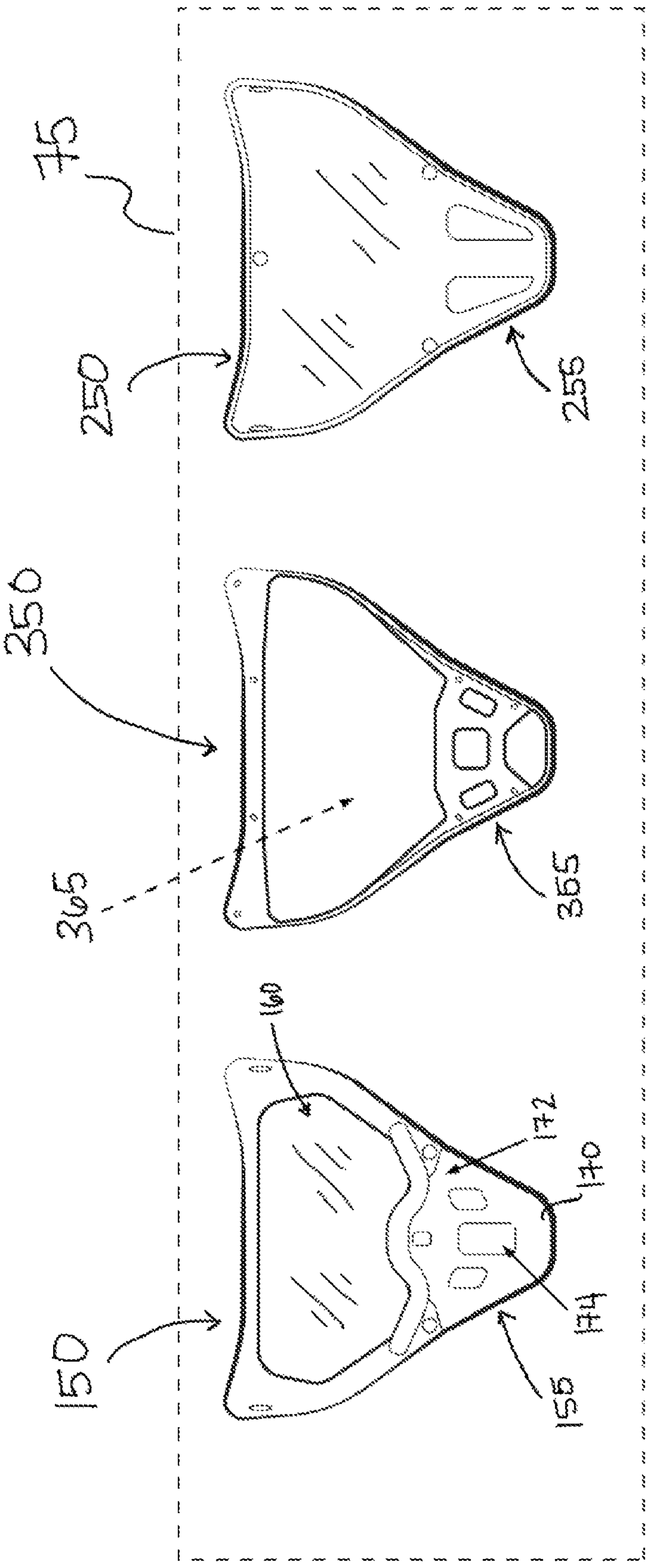
FIG. 3 is a rear elevation view of the family of masks of FIG. 2.

Each helmet of the family 50 of helmets is formed from a same helmet shell 10 and one mask of a family 75 of masks. The family 75 of masks is illustrated in FIGS. 2 and 3. Each helmet 100, 200, 300, and its corresponding mask 150, 250, 350, is described individually in greater detail below.

The helmet shell 10, used for each helmet 100, 200, 300 of the family 50, is illustrated in more detail in FIGS. 4 to 9. The helmet shell 10, also referred to herein as the shell 10, defines an inner volume configured to receive the head of the wearer of the given helmet.

The helmet shell 10 includes a crown portion 12 configured to generally cover a top and rear of the head of the wearer. The shell 10 also includes a jaw shield portion 14 integrally connected to the crown portion 12. The jaw shield portion 14 is positioned and shaped to extend around and in front of a jaw area of the wearer of the helmet 10 thereby shielding it, as its name suggests. As will be described in more detail below, each mask of the family 75 of masks includes an additional jaw portion for surrounding and shielding the jaw area of the wearer in cooperation with the jaw shield portion 14.

Figure 4:
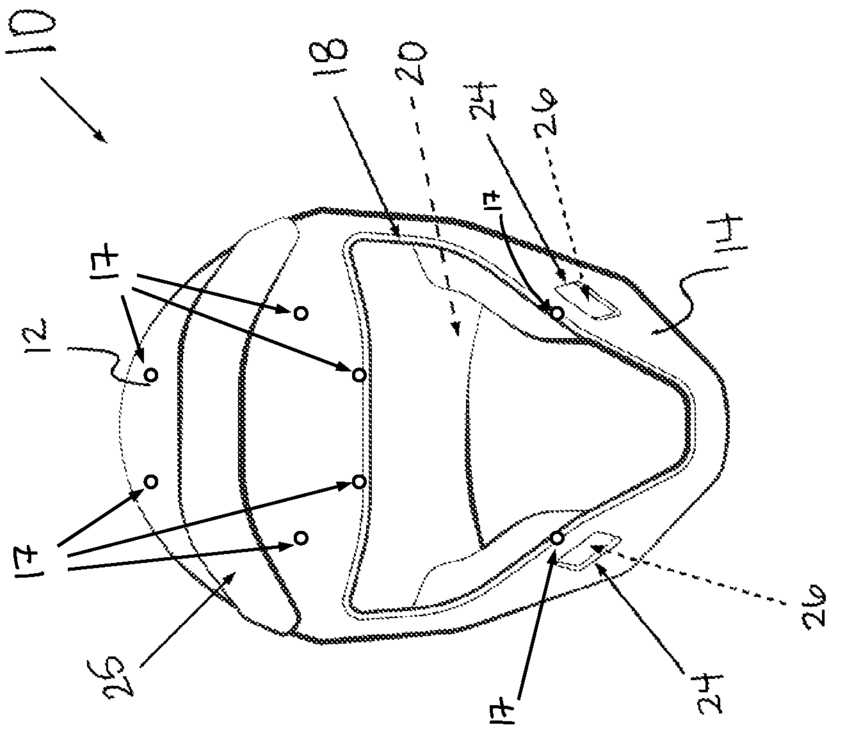
FIG. 4 is a front elevation view of a helmet shell for forming the family of helmets of FIG. 1.

As is illustrated in FIG. 4, the helmet shell 10 includes eight helmet positioning magnets 17 disposed in a front part of the crown 12 and jaw shield portion 14. The magnets 17 are arranged to selectively connect the mask 150, 250, 350 to the helmet shell 10 in an open position or a closed position. Corresponding mask magnets 19 are illustrated on mask 250 and mask 350 in FIG. 2, although different arrangements of magnets are contemplated. It is also contemplated that the magnets 17 could be omitted in some embodiments of the helmet shell 10.

The helmet shell 10 further includes a bottom trim 16. The bottom trim 16 forms the bottom side of the helmet shell 10 (oriented in standard wearing position) and is disposed generally opposite the crown portion 12. As the jaw portion 14 is integrally connected to the crown portion 12, the bottom trim 16 is generally continuous around the helmet shell 10.

The helmet shell 10 has an aperture edge 18 formed by the crown portion 12 and the jaw shield portion 14. The aperture edge 18 extends generally around a space in the helmet shell 10 where a face of the wearer would be when in use. The aperture edge 18 defines a front aperture 20 allowing the wearer of the helmet 10 to see therethrough. When in use, the front aperture 20 is sized and arranged to expose a mouth of the wearer, in addition to eye and nose areas, when there is no mask closing the front aperture 20. Specifically, a bottom most portion of the edge 18 of the front aperture 20 is disposed vertically lower than a mouth of the wearer when in use.

The helmet shell 10 further includes features for selectively connecting to various accessories. Three possible accessories for connecting to the helmet shell 10 (and thus any member of the family 50 of helmets) are described below: a power conductor 500, a storage fixation 550, and a garment 600. Additional and alternative accessories for selectively connecting to or receiving the helmet shell 10 are contemplated. For connecting to one or all of these accessories, the helmet shell 10 defines therein a connector chamber 40 and a connector aperture 45 opening into the connector chamber 40. The connector chamber 40 may also be referred to as an anchor chamber 40, as the chamber 40 is shaped and arranged to receive therein different types of connections (both electrical connectors and rotating anchors). Similarly, the aperture 45 is also referred to as an anchor aperture 45 as it is also sized and shaped to receive an accessory anchor therethrough (described further below).

Figure 5:
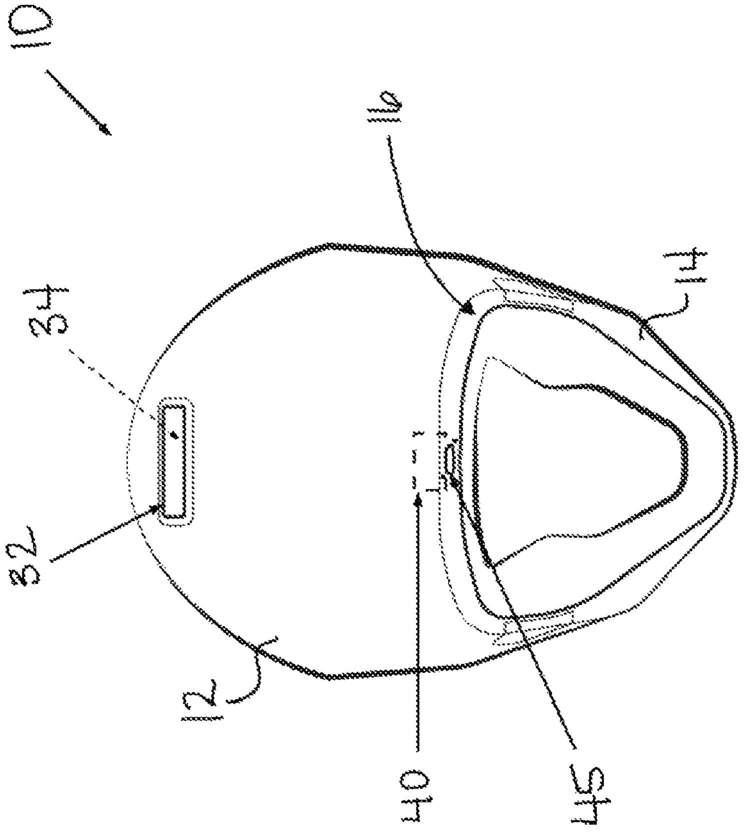
FIG. 5 is the rear elevation view of the helmet shell of FIG. 4.
Figure 6:
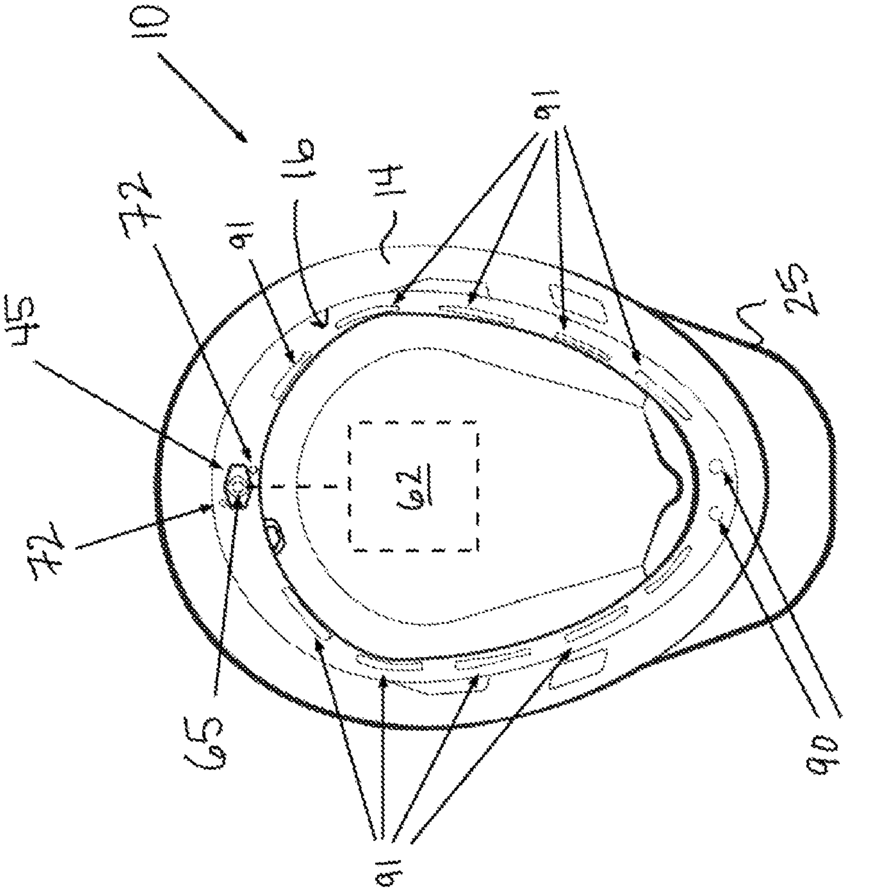
FIG. 6 is a bottom plan view of the helmet shell of FIG. 4.
Figure 7:
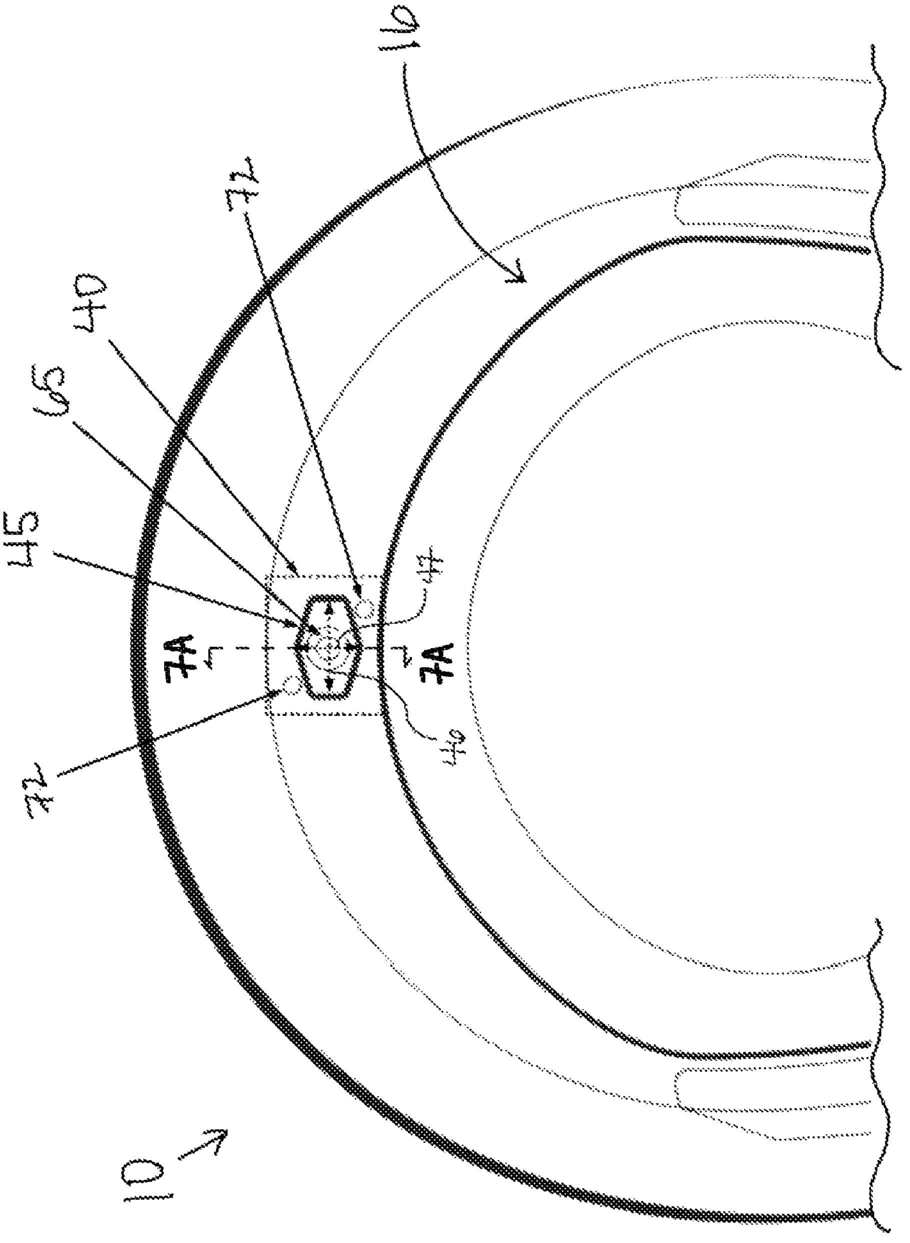
FIG. 7 is a close-up, partial, bottom plan view of the helmet shell of FIG. 4.
Figure 7A:
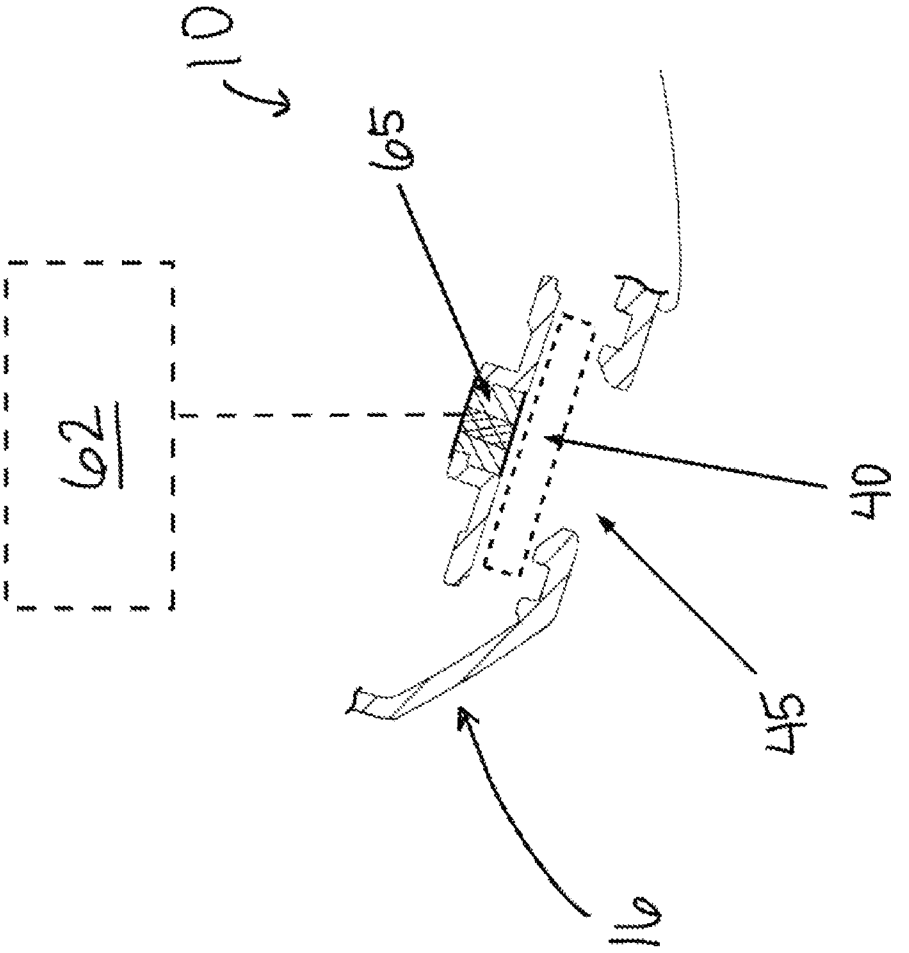
FIG. 7A is a cross-sectional view of a portion of the helmet shell of FIG. 4, taken along line 7A-7A of FIG. 7.

As can be seen in FIGS. 5 to 7, the connector aperture 45 is defined in a bottom surface of the bottom trim 16. The connector chamber 40 is defined within the bottom trim 16 (FIG. 7A). In the illustrated embodiment, the connector aperture 45 and the chamber 40 are defined in a rear portion of the bottom surface of the shell 10, i.e. to the rear of the neck and behind the head of the wearer when in use. In at least some embodiments, it is contemplated that the connector aperture 45 and the chamber 40 could be defined in a front portion of the shell 10, for instance in a bottom part of the jaw portion 14. In such a case, the chamber 40 would allow accessories to be connected to the helmet shell 10 below the jaw portion 14.

The aperture 45 is generally hexagonal in the present embodiment, although different shapes are contemplated. As can be seen in FIG. 7, the aperture 45 has a first dimension 46 extending along a left-right axis of the helmet shell 10 and a second dimension 47 extending along a forward-rearward axis of the helmet shell 10 (orthogonal to the first dimension 46). The first dimension 46 is greater than the second dimension 47, with the aperture 45 being of a generally oblong hexagonal form. In some embodiments, it is contemplated that the aperture 45 could be differently oriented, for example with a forward-rearward dimension being greater than a left-right dimension.

As can be seen in FIG. 7A, a forward-rearward extent of the chamber 40, as defined in the trim 16, is wider than the second dimension 47 of the aperture 45. This form of the chamber 40 permits the chamber 40 to receive therein an anchor (such as an anchor 570 described below) shaped and sized to pass through the aperture 45 and then to be rotated within the chamber 40. For anchors shaped similarly to the aperture 45, specifically generally hexagonal, the anchor can be selectively connected to the helmet shell 10 when the anchor is rotated in the chamber 40 relative to the helmet shell 10 by a quarter-turn. In at least some embodiments, the chamber 40 could be wider along a left-right extent of the chamber 40 defined in the helmet shell 10. It is also contemplated that the chamber 40 could selectively receive therein other anchors than those described herein.

The helmet shell 10 further includes two helmet trim magnets 90 disposed in a front part of the bottom surface of the bottom trim 16, as well as a series of slots 91 defined in the trim 16. As will be described in more detail below, the trim magnets 90 and the slots 91 are arranged to selectively connect the helmet shell 10 to the garment 600, although additional uses could be contemplated. It is also contemplated that the trim magnets 90 could be omitted in some embodiments of the helmet shell 10.

Figure 8:
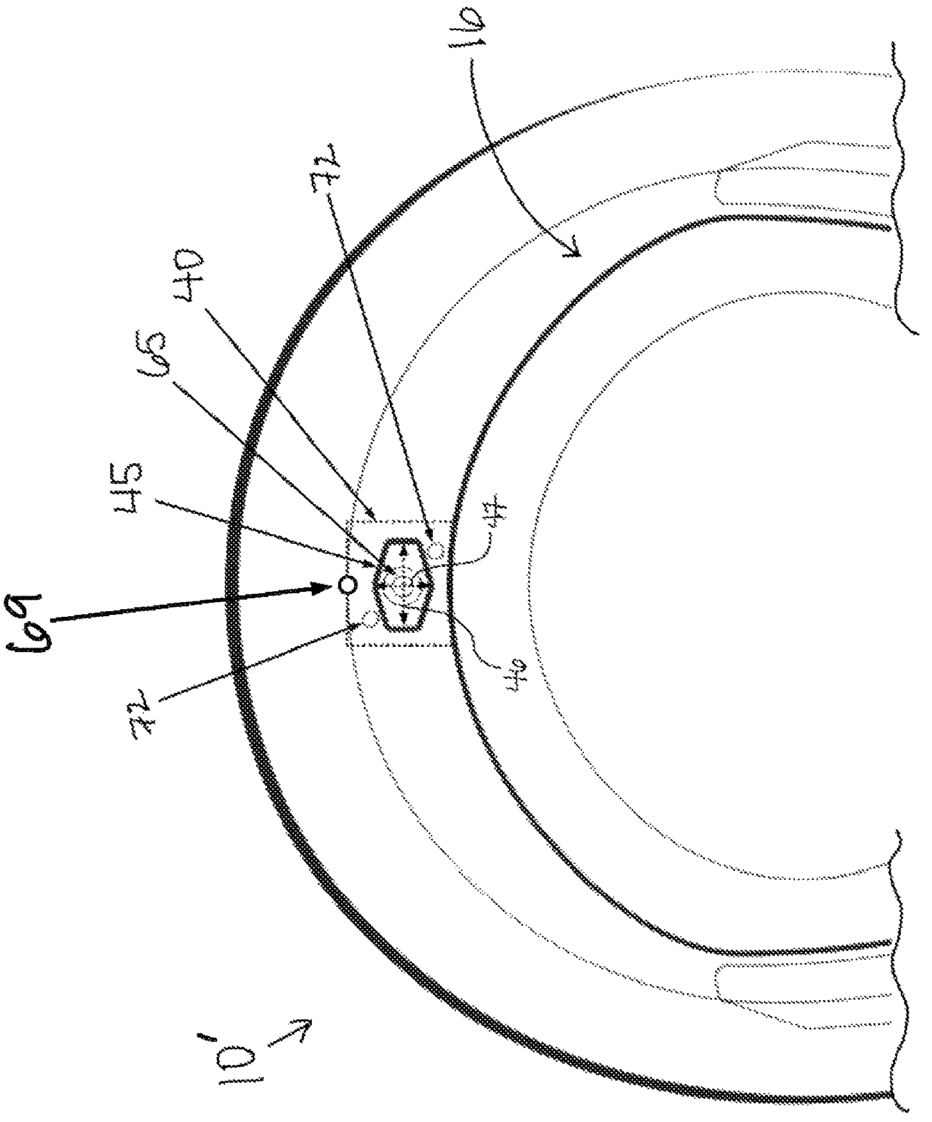
FIG. 8 is a close-up, partial, bottom plan view of another non-limiting embodiment of a helmet shell.

In some embodiments, the helmet shell could have additional apertures for different connection mechanisms. As is illustrated in FIG. 8, another non-limiting embodiment of a helmet shell 10' has defined therein a locking pin aperture 69 for selectively receiving a locking pin 599 therein (described in greater detail below).

In the illustrated embodiment, the helmet shell 10 includes a peak 25 connected to the crown portion 12. In some embodiments, the peak 25 could be omitted or selectively removable from the crown portion 12. The peak 25 is selectively adjustable between a downward configuration (as illustrated) and an upward configuration (not shown word), the peak 25 thus being vertically adjustable.

The helmet shell 10 has a plurality of vent and vent apertures defined therein to allow air flow through the helmet shell 10. A left jaw vent aperture 24 is defined in a left side of the jaw shield portion 14 and a mirror-image right jaw vent aperture 24 is defined in a right side of the jaw shield portion 14. The left jaw vent aperture 24 opens into a left jaw vent 26 defined in the left side of the jaw shield portion 14. Similarly, the right jaw vent aperture 24 opens into a right jaw vent 26 defined in the right side of the jaw shield portion 14. As will be described further below, at least some embodiments of the helmets of the family 50 of helmets include jaw vent blockers to selectively close the left and right jaw vents 26.

Figure 9:
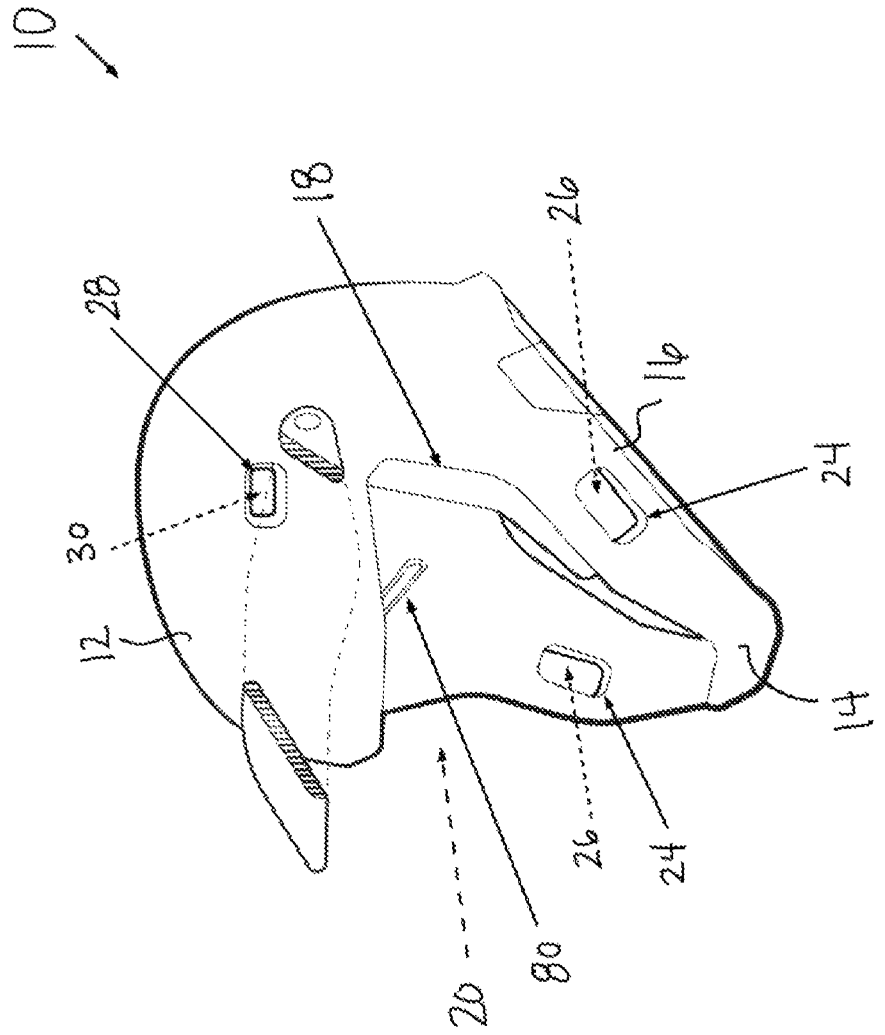
FIG. 9 is a top, front, left side perspective view of the helmet shell of FIG. 4, with a portion of a peak of the helmet shell having been removed.

As can be seen in FIG. 9, with the peak 25 having been partially removed, the helmet shell 10 also has a left forward vent aperture 28 opening into a left forward vent 30 defined in a left forward part of the crown portion 12. While not explicitly illustrated in the figures, a right forward vent aperture 28 opening into a right forward vent 30 is also defined in a right forward part of the crown portion 12, in a mirror-image position. In at least some embodiments, the helmet shell 10 could include a left forward vent blocker, such as the vent blocker 29 for the helmet 100 of FIG. 10, selectively disposed in the left forward vent aperture 28 for selectively blocking the left forward vent 30 and a right forward vent blocker selectively disposed in the right forward vent aperture 28 for selectively blocking the right forward vent 30.

The helmet shell 10 also has a rear vent aperture 32 opening into a rear vent 34 in a rear part of the crown portion 12 (FIG. 5). In some embodiments, the shell 10 could include a rear vent blocker (not shown) for selectively inserting in the rear vent aperture 32 for selectively blocking the rear vent 34.

In the present embodiment, the helmet shell 10 further includes one or more electrical devices disposed therein, illustrated schematically as one electrical device 62 in FIG. 6. While not specifically limited by the present technology, the electrical device 62 could include, but is not limited to: one or more lights, a heater visor (in at least some embodiments), venting fans, one or more communication devices, an active sweat extraction fabric, a cooling system, a heads-up display, a helmet heater, and a sound device.

To provide power to the electrical device 62, the helmet shell 10 further includes an electrical contact 65 disposed in the chamber 40. The electrical contact 65 is electrically connected to the electrical device 62. The electrical contact is adapted for electrically coupling to a helmet power connector or power cord, such as a power connector 500 described further below, for electrically connecting the helmet shell 10 to a power source. Use of the electrical contact 65 will be described in further detail below. In at least some embodiments, it is contemplated that the electrical device 62 and the electrical contact 65 could be omitted from the helmet shell 10. It is also contemplated that the bottom trim 16 of the helmet shell 10 could be configured to receive a connector for providing air or liquid to the wearer, additionally or alternatively to the chamber 40.

The helmet shell 10 further includes two magnets 72 disposed in a vicinity of the aperture 45, specifically on the bottom surface of the trim 16. One magnet 72 is disposed on one side of the aperture 45 and the other magnet disposed on the opposite side of the aperture 45, each magnet 72 also being disposed on generally opposite lateral ends. The magnets 72 are configured and arranged to selectively magnetically connect at least one magnet of an accessory being connected thereto. As will be described in more detail below, the helmet shell 10 is configured to selectively secure to the power connector 500 and the garment 600 thereto by aligning the magnets 72 adjacent to the aperture 45 with corresponding magnets thereof. Depending on the magnet arrangements of the accessories, it is contemplated that the exact positions of the magnets 72 could also vary. In at least some embodiments, it is also contemplated that the magnets 72 could be omitted.

As is mentioned above, each helmet 100, 200, 300 is formed from the helmet shell 10 and a mask selected from the family 75 of masks. The family 75 of masks includes a cold weather adapted mask 150, a high vision mask 150, and a motocross style mask 350; each mask 150, 250, 350 is described in greater detail below. Each helmet 100, 200, 300 thus includes a corresponding one of the masks 150, 250, 350 selectively connected to the helmet shell 10. The mask 150, 250, 350 is disposed in the front aperture 20 to form the corresponding helmet, with an outer contour of each mask 150, 250, 350 being sized and shaped to conform to the aperture edge 18.

Figure 10:
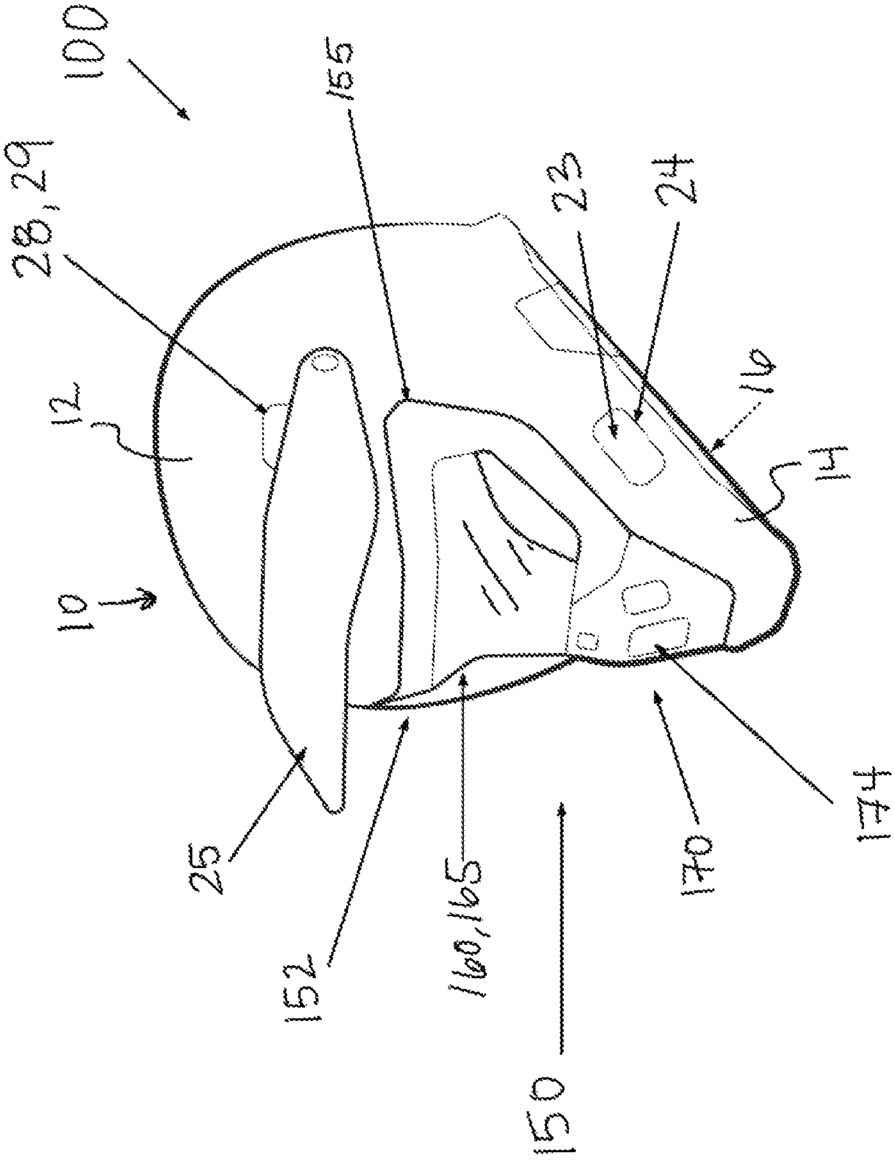
FIG. 10 is a top, front, left side perspective view of one helmet of the family of helmets of FIG. 1, with a mask of the helmet in a closed position.
Figure 11:
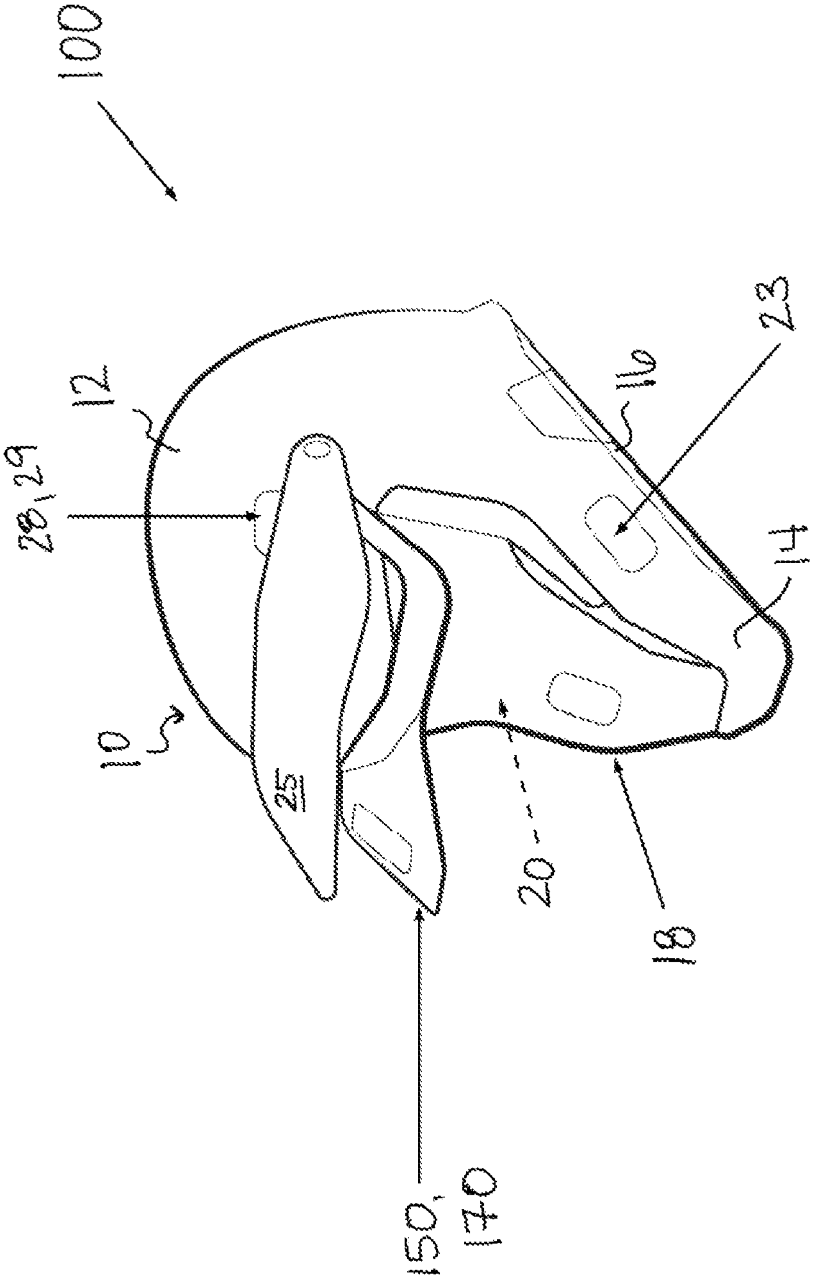
FIG. 11 is the top, front, left side perspective view of the helmet of FIG. 10, with the mask in an open position.
Figure 12:
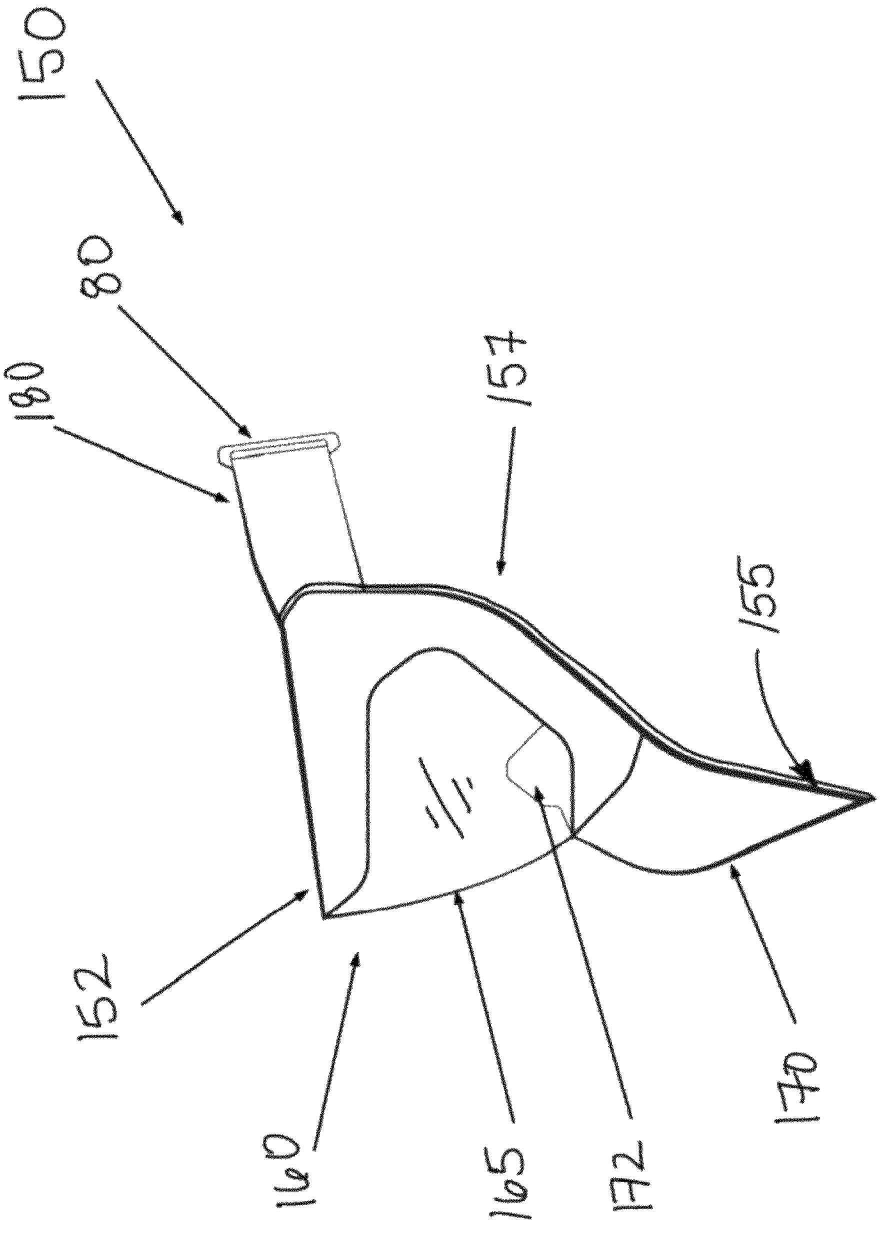
FIG. 12 is a left side elevation view of the mask of the helmet of FIG. 10.

With continued reference to FIGS. 1 to 3 and with reference to FIGS. 10 to 12, the cold weather adapted helmet 100 is formed by combining the helmet shell 10 and the cold weather adapted mask 150. While referred to herein as a cold weather riding type helmet, it is contemplated that the helmet 100 could be worn in different conditions, including but not limited to, cold weather.

The mask 150 includes a mask body 152 for selectively closing the front aperture 20 of the helmet shell 10. The mask body 152 includes a visor portion 160 and a jaw shield portion 170 integrally connected to the visor portion 160. The mask 150 has an outer contour 155 formed by an outer edge of the visor portion 160 and the jaw portion 170. The outer contour 155 is shaped to mate with the aperture edge 18 of the helmet shell 10 in order to close the front aperture 20 and thus close the front portion of the helmet 100.

As the mask 150 is configured for cold weather, the mask body 152 is generally configured to minimize the flow of cold from outside of the helmet 100 into an interior of the helmet 100. The mask body 152 includes a sealing member 157 disposed along the outer contour 155. In the present embodiment, the sealing member 157 is a rubber membrane but different materials and arrangements are contemplated. The sealing member 157 is configured to aid in impeding the passage of air between the mask body 152, and more specifically the outer contour 155, and the helmet shell 10 when the mask body 152 is disposed in the front aperture 20.

As indicated by the name, the visor portion 160 is configured and arranged to allow the wearer to see through the mask 150. A central part of the visor portion 160, referred to as a shield 165, is formed from a hardened, transparent material, such as polycarbonate to allow the wearer to see therethrough. Outer parts of the visor portion 160 is formed from rigid material (such as hardened plastic or rubber) to aid in providing structure for the mask body 152; these parts may not be transparent. Depending on the embodiment, the outer parts of the visor portion 160 could be transparent as well.

The jaw portion 170 is generally formed from a rigid, insulating material, such as hardened rubber. The jaw portion 170 is arranged such that, when the helmet 100 is worn, it extends from below the mouth up to above the nose of the wearer. As is illustrated in FIGS. 3 and 12, the jaw portion 170 of the mask 150 also includes an anti-fog sealing member 172. When in use, the anti-fog sealing member 172 impedes passage of air between the jaw portion 170 and the visor portion 160. The sealing member 172 is formed from rubber in the present embodiment, but other materials are contemplated. When the helmet 100 is in use in cold weather conditions, the sealing member 172 aids in limiting condensation on an interior of the visor portion 160, specifically by preventing warm exhalations from the wearer from coming into contact with the likely colder visor portion 160.

In order to allow air exchange for the wearer of the helmet 100, the jaw portion 170 defines therein a selectively openable vent 174 fluidly connecting an interior of the jaw portion 170 with air exterior to the mask body 152. Depending on the particular embodiment, the jaw portion 170 could have additional vents 174. As the vent 174 disposed in the jaw portion 170 below the sealing member 172, fresh air can be delivered to the mouth and nose of the wearer when in use. In some embodiments, the mask 150 could also include an upper vent (not shown) to allow some air flow through the visor area.

The mask 150 further includes two connecting members 180 for connecting the mask body 152 to the helmet shell 10. In the illustrated embodiment, the connecting members 180 are resilient connecting members 180 for connecting the mask body 152 to the helmet shell 10. As will be described in more detail below, the resilient members 180 bias the mask body 152 toward a closed position. In at least some embodiments, the mask body 152 could alternatively be connected to the helmet shell 10 by snaps or hook and loop style fasteners.

In the illustrated embodiment, the resilient connecting members 180 include a left side elastic strap 180 and a right side elastic strap 180 (not shown). Depending on the embodiment, different connecting member arrangements are contemplated. For example, the mask 150 could include one elastic strap connected at both ends to the mask 150 and extending through a portion of the helmet shell 10.

The elastic straps 180 are selectively connected to the helmet shell 10. In the present embodiment, the helmet shell 10 includes two brackets 80 through which distal ends of the straps 180 are looped for linking the mask 150 to the helmet shell 10. A right bracket 80 is illustrated as connected to an interior of the helmet shell 10 in FIG. 9; a left bracket 80 is illustrated as connected to the left strap 180. In order to remove the mask 150, for instance to change the type of helmet by attaching a different type of mask to the helmet shell 10, such as the mask 250, the straps 180 are removed from the brackets 80 by unlooping the end of the strap 180 and sliding the strap 180 out of the bracket 80. With both straps 180 removed, straps from another mask can be attached to the brackets 80.

The mask body 152 is selectively displaceable between a closed position (FIG. 10) and an open position (FIG. 11). The mask body 152 may also be moved to positions intermediate the closed and open positions, but these are not contemplated to be stable positions in the present embodiment. The straps 180 are positioned and arranged to bias the mask body 152 toward the closed position, with the straps 180 being stretched in positions other than the closed position.

In the closed position, the mask body 152 closes the front aperture 20 of the helmet shell 10. The jaw shield portion 170 is mated with the jaw shield portion 14 of the helmet shell 10 when closed, such that the mouth and jaw area of the wearer is surrounded when the mask body 152 is in the closed position.

In the open position, the mask body 152 is displaced away from the front aperture 20. To maintain the mask body 152 in the open position, the mask body 152 is disposed partially on the crown portion 12 of the helmet shell 10 (see FIG. 11). Tension applied by the straps 180 aid in maintaining the mask body 152 on the crown portion 12. As is noted above, the front aperture 20 is sized and arranged to expose the mouth of the wearer when uncovered. Thus, when the mask body 152 is in the open position, the wearer can access their mouth, for example to more easily speak or cat without being required to remove the helmet 100.

Since the helmet 100 is adapted for cold weather, the left and right jaw vent blockers 23 are disposed in the left and right jaw vent apertures 24. The vent blockers 23 are arranged to impede a flow of cold air through the left and right jaw vents 26. In at least some embodiments, the forward vents 30 of the helmet shell 10 could also be selectively blocked to impede the flow of cold air through the helmet 100. In such a case, the left and right forward vent blockers 29 could be selectively disposed in the left and right forward vent apertures 28.

Figure 13:
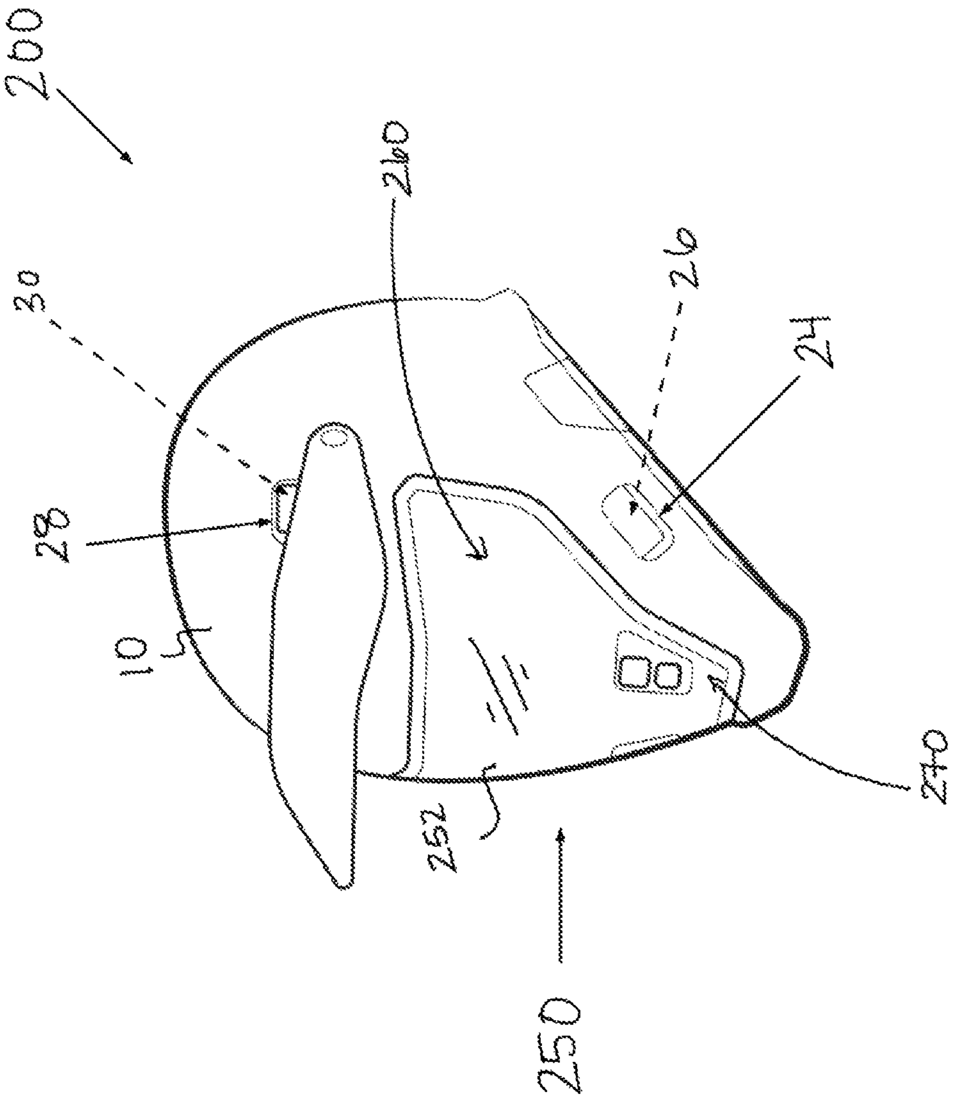
FIG. 13 is a top, front, left side perspective view of another helmet of the family of helmets of FIG. 1, with a mask of the helmet in a closed position.
Figure 14A:
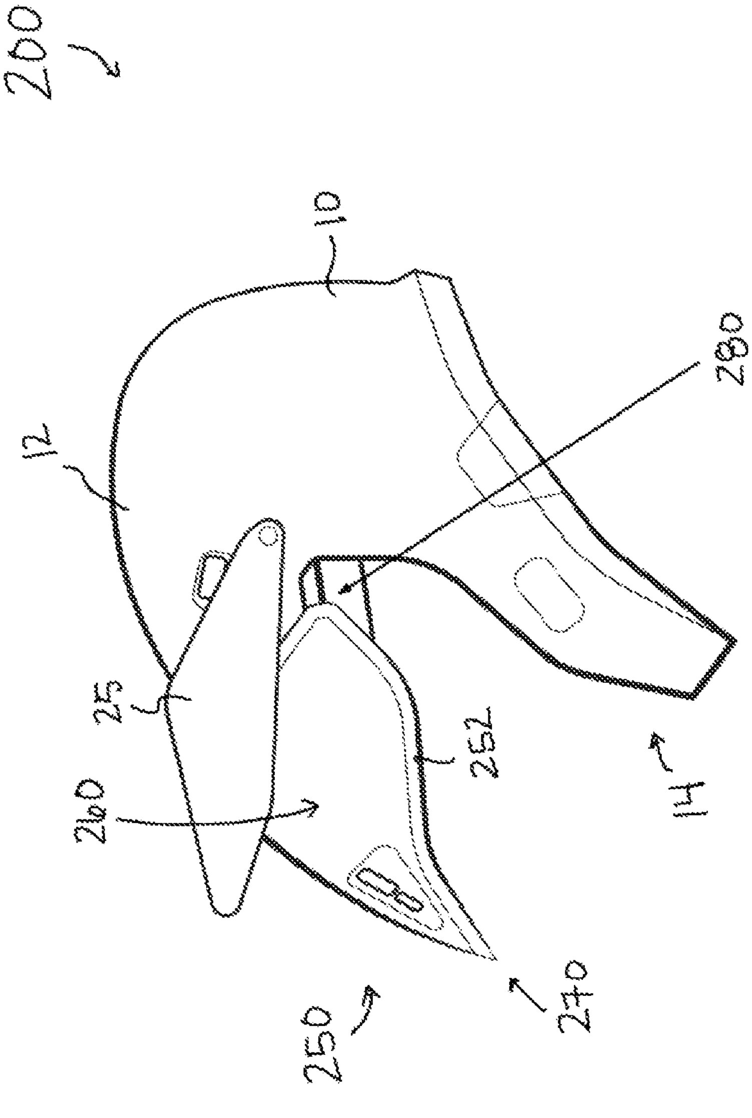
FIG. 14A is a left side elevation view of the helmet of FIG. 13, with the mask in an open position.
Figure 14B:
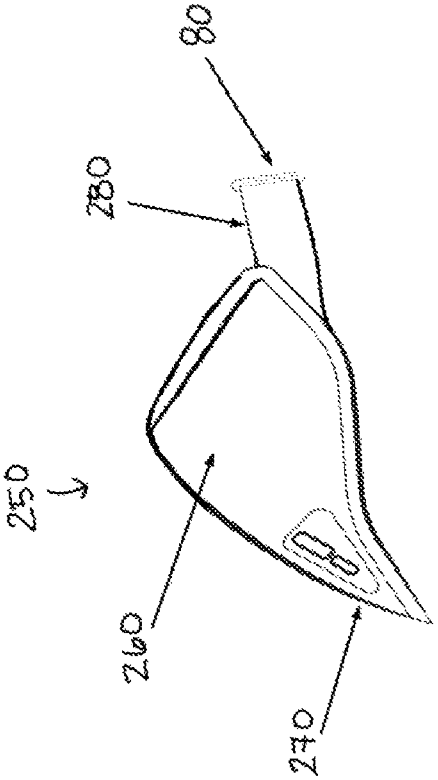
FIG. 14B is a left side elevation view of the mask of the helmet of FIG. 13.

Another helmet 200 of the family 50 of helmets is illustrated in FIGS. 13 to 14B, with continued reference to FIGS. 1 to 3. The helmet 200 is formed by combining the helmet shell 10 and the mask 250. The helmet 200 is referred to herein as a "high vision" helmet, as the mask 250 is formed and arranged to increase a field of view for the wearer, but it is noted that this is simply a label for case of reference and not meant to indicate any specific improvement on vision using the helmet 200. The helmet 200 is generally adapted for warmer weather riding conditions simply by default, as it is not adapted for cold weather conditions.

The mask 250 includes a mask body 252 including a visor portion 260 for permitting the wearer to see therethrough. The visor portion 260 is formed from a transparent, rigid material, generally hardened plastic adapted for safe use in helmet visors or goggles, such as polycarbonate. The mask body 252 also includes a jaw shield portion 270 integrally connected to the visor portion 260. Specifically, the jaw shield portion 270 and the visor portion 260 are formed as a single component from the same transparent material. As there is no sealing member included to impede air flow between the jaw portion 270 and the visor portion 260, no mouth surrounding structure is generally required, and the transparent area of the mask body 252 is maximized.

The mask 250 has an outer contour 255 formed by an outer edge of the visor portion 260 and the jaw portion 270. The outer contour 255 is shaped to mate with the aperture edge 18 of the helmet shell 10 in order to close the front aperture 20 and thus close the front portion of the helmet 200. As the helmet shell 10 is the same for both the helmets 100, 200, it is noted that the contour 255 has the same shape and size as the contour 155 of the mask 150 (since both masks 150, 250 are shaped to mate to the aperture 18).

In order to limit direct air flow between the mask 250 and the helmet shell 10, the mask body 252 includes a sealing member 257 disposed along the outer contour 255. In the present embodiment, the sealing member 257 is a rubber membrane but different materials and arrangements are contemplated. The sealing member 257 is configured to aid in impeding the passage of air and/or debris (such as dust) between the mask body 252 and the helmet shell 10 when the mask body 252 is disposed in the front aperture 20.

The mask 250 further includes two connecting members 280 for connecting the mask body 252 to the helmet shell 10. In the illustrated embodiment, the connecting members 280 are resilient connecting members 280 for connecting the mask body 252 to the helmet shell 10. Specifically, the resilient connecting members 280 include a left side elastic strap 280 and a right side elastic strap 280 (not shown). Depending on the embodiment, different connecting member arrangements are contemplated. For example, the mask 250 could include one elastic strap connected at both ends to the mask 250 and extending through a portion of the helmet shell 10.

The elastic straps 280 are selectively connected to the helmet shell 10. Specifically, the straps 280 are connected to the brackets 80 of the helmet shell 10 (see FIG. 15). In order to remove the mask 250, for instance to change the type of helmet by attaching a different type of mask to the helmet shell 10, such as the mask 150, the straps 280 are removed from the brackets 80 by unlooping the end of the strap 280 and sliding the strap 280 out of the bracket 80. With both straps 280 removed, straps from another mask can be attached to the brackets 80.

Similarly to the helmet 100, the mask body 252 is selectively displaceable between a closed position (FIG. 13) and an open position (FIG. 14A). The mask body 252 may also be moved to positions intermediate the closed and open positions, but these are not contemplated to be stable positions in the present embodiment.

In the closed position, the mask body 252 closes the front aperture 20 of the helmet shell 10. The jaw shield portion 270 is mated with the jaw shield portion 14 of the helmet shell 10 when closed, such that the mouth and jaw area of the wearer is surrounded when the mask body 252 is in the closed position.

In the open position, the mask body 252 is displaced away from the front aperture 20. To maintain the mask body 252 in the open position, the mask body 252 is disposed partially on the crown portion 12 of the helmet shell 10. Tension applied by the resilient connecting members 280 aid in maintaining the mask body 252 on the crown portion 12. As is noted above, the front aperture 20 is sized and arranged to expose the mouth of the wearer when uncovered. Thus, when the mask body 252 is in the open position, the wearer can access their mouth, for example to more easily speak or eat without being required to remove the helmet 200.

As the helmet 200 is not specifically adapted for use in cold weather conditions, the vent blockers 23 are not installed in the jaw vent apertures 24, allowing air flow through the jaw vents 26. In at least some embodiments, it is contemplated that the vent blockers 23 could be connected to the helmet shell 10, for example in high dust conditions.

Figure 15:
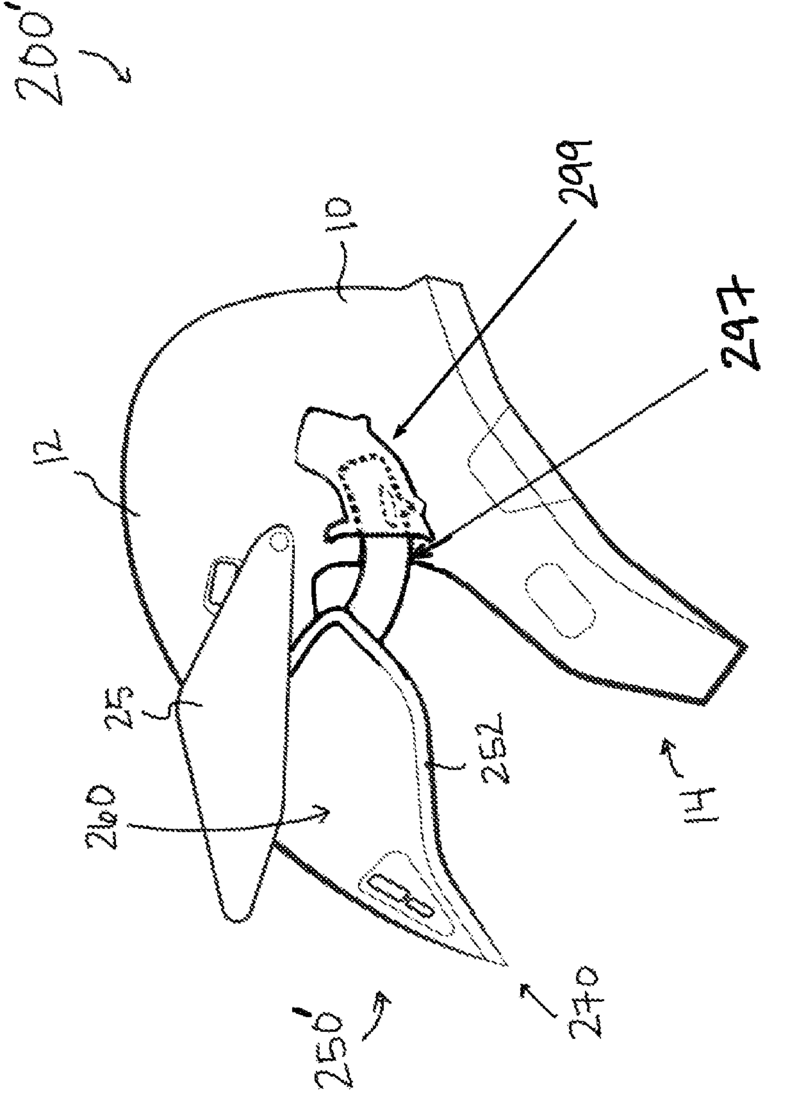
FIG. 15 is a left side elevation view of the helmet of FIG. 13, with another embodiment of a mask in an open position.

In some other non-limiting embodiments, the mask could be differently attached to the helmet shell 10. In FIG. 15, another non-limiting embodiment of a mask 250' is illustrated. On each left and right side, the mask 250' has a rigid bar 297 (only left being shown) which is received in a corresponding rail 299 connected to the helmet shell 10, thereby forming a hinge mechanism. Bump and notch features permit the mask 250' to be positioned in open (shown) and closed positions.

Figure 16:
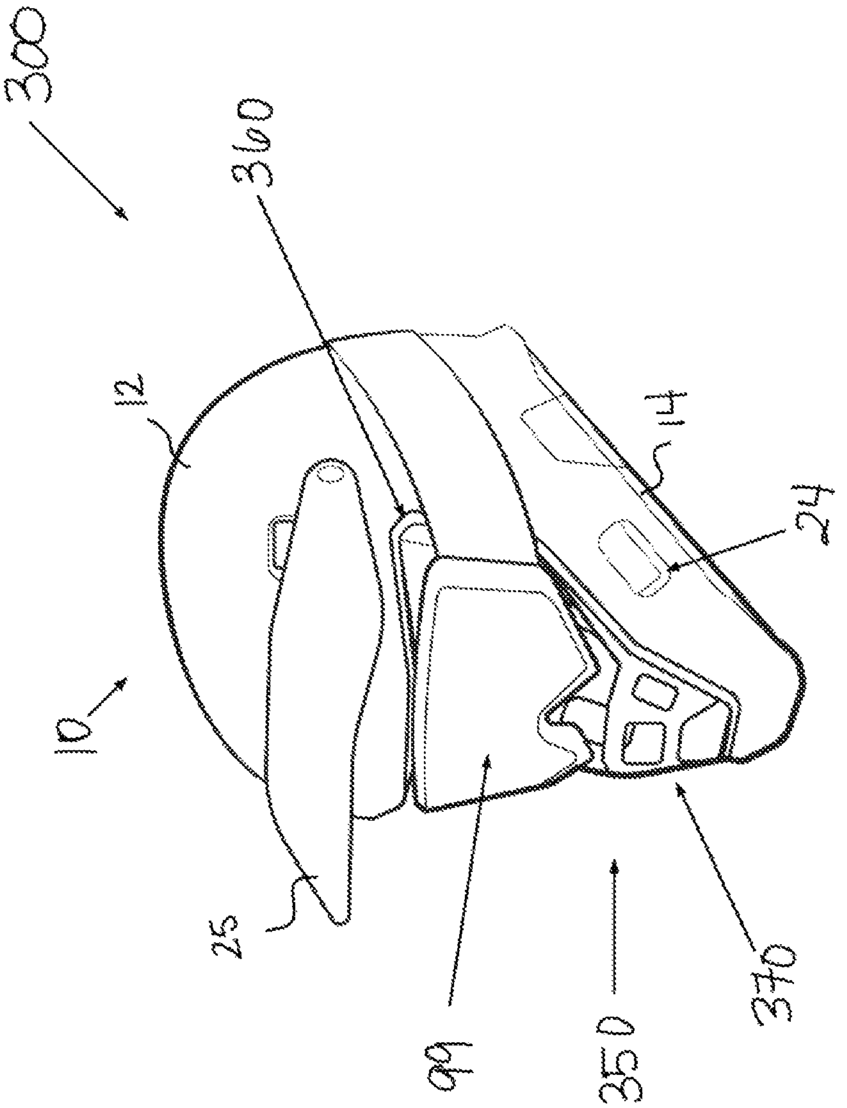
FIG. 16 is a top, front, left side perspective view of yet another helmet of the family of helmets of FIG. 1, with goggles being attached to the helmet.
Figure 17:
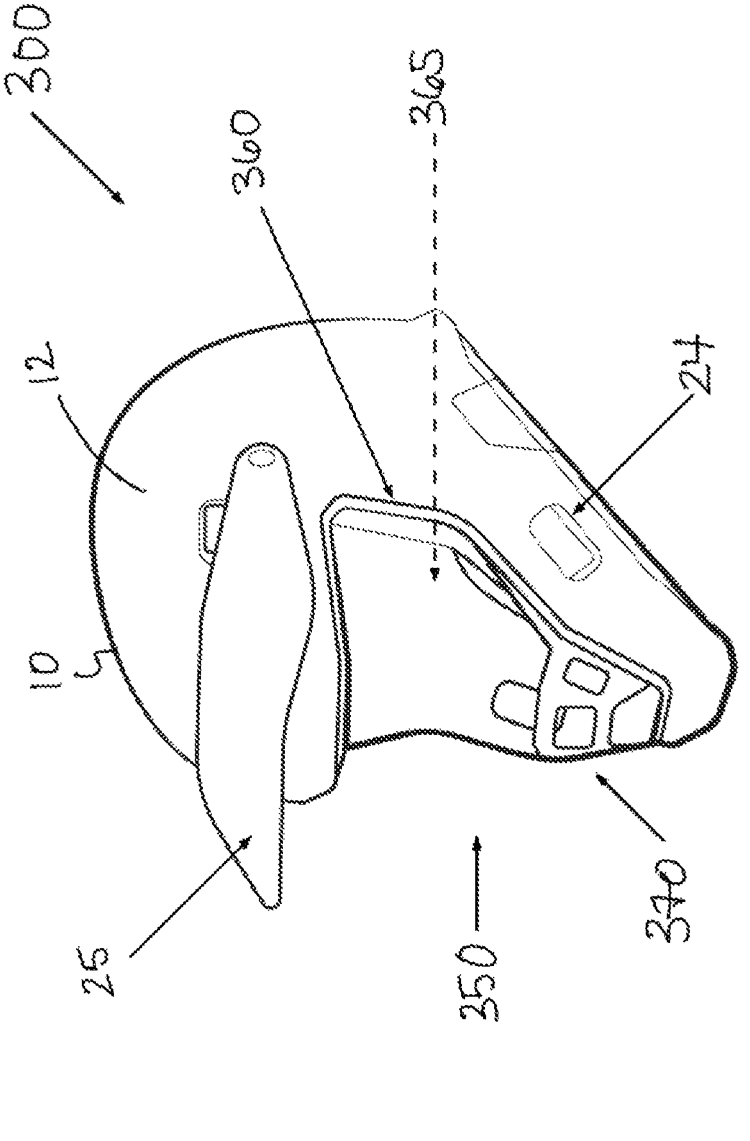
FIG. 17 is the top, front, left side perspective view of the helmet of FIG. 16, with the goggles having been removed.

With continued reference to FIGS. 1 to 3 and reference to FIGS. 16 and 17, the helmet 300 is formed by combining the helmet shell 10 and the mask 350. The helmet 300 is of another helmet type, specifically a motocross-style helmet type. For a motocross-style helmet 300, the mask 350 generally provides an open face area for the wearer to permit the use of goggles in conjunction with the helmet 300.

Specifically, the mask 350 includes a mask body 352, different from the mask bodies 152, 252 of the masks 150, 250. The mask body 352 includes a face portion 360 defining a goggle aperture 365 arranged to permit goggle usage when the helmet 300 is worn. In FIGS. 1 and 16, the helmet 300 is illustrated with a non-limiting example of goggles 99 attached thereto.

The mask body 352 also includes a jaw portion 370 integrally connected to the face portion 360. The jaw portion 370 is mated with the jaw shield portion 14 of the helmet shell 10 when connected thereto, such that the mouth and jaw area of the wearer is surrounded when in use. The mask body 352 generally leaves the nose area of the wearer generally exposed, with the jaw portion 370 being disposed generally lower than the nose of the wearer when in use.

The mask 350 has an outer contour 355 formed by an outer edge of the visor portion 360 and the jaw portion 370. The outer contour 355 is shaped to mate with the aperture edge 18 of the helmet shell 10 in order to properly connect to the helmet shell 10. It is noted, in contrast to the masks 150, 250, that since the mask body 352 is open, the mask 350 does not close the front portion of the helmet 100.

In order to permit flow of air through the helmet 300, the vent blockers 23 are not installed in the jaw vent apertures 24. In at least some embodiments, it is contemplated that the vent blockers 23 could be connected to the helmet shell 10, for example in high dust conditions.

In contrast to the helmets 100, 200, the mask body 352 is not generally selectively moveable between an open position and a closed position. By removing the goggles 99, a front of the helmet 300 is already generally open. In at least some embodiments, the jaw portion 370 could be selectively removeable from the mask body 352 in order to provide access to the mouth of the wearer while wearing the helmet 300.

Figure 18:
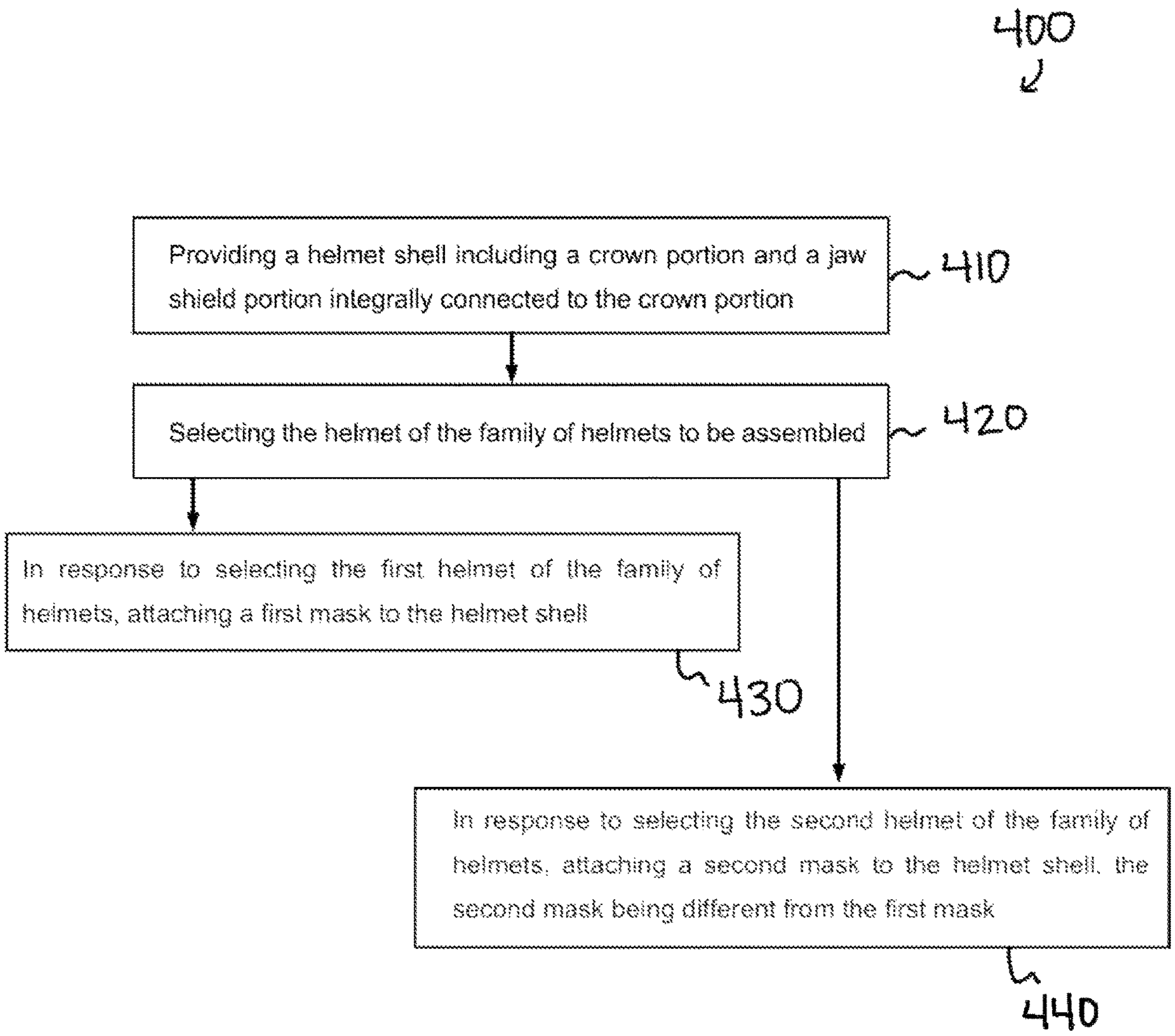
FIG. 18 is a flow chart illustrating a method for constructing a helmet of the family of helmets of FIG. 1.

Based on the above-described family 50 of helmets, having the family 75 of helmets and a variety of vent blocking or opening arrangements, there is illustrated in FIG. 18 a method 400 for assembling one helmet of the family 50 of helmets.

The method 400 begins, at step 410, with providing the helmet shell 10 including the crown portion 12 and the integrally connected jaw shield portion 14.

The method 400 continues, at step 420, with selecting the helmet to be assembled from the family 50 of helmets. In the present non-limiting example implementation of the method 400, either the helmet 100 or the helmet 200 is chosen to be assembled. In different embodiments, any of the helmets 100, 200, 300 of the family 50 of helmets could be chosen to be assembled. It is also contemplated that additional or alternative helmets could be included in the family 50 and could be chosen during the method 400.

In response to selecting the helmet 100 of the family 50 of helmets, the method 400 continues, at step 430, with attaching the mask 150 to the helmet shell 10. The combination of the mask 150 and the helmet shell 10 thus forms the helmet 100. In some cases, selecting the helmet 100 includes selecting a particular type of helmet adapted for a particular type of riding conditions. In the case of the helmet 100, selecting the helmet 100 includes selecting a cold weather adapted helmet for cold weather riding conditions.

In some embodiments, the method 400 further includes, in response to selecting the helmet 100, connecting the left vent blocker 23 to the helmet shell 10, the left vent blocker being disposed in the left jaw vent aperture 24 and connecting the right vent blocker 23 to the helmet shell 23, the right vent blocker 23 being disposed in the right jaw vent aperture 24. In some embodiments, the method 400 could further include installing vent blockers in the vents 28 and/or the vent 34.

In response to selecting the helmet 200 of the family 50 of helmets, the method 400 continues, at step 440, with attaching the mask 250 to the helmet shell 10. The combination of the mask 250 and the helmet shell 10 thus forms the helmet 200.

In some cases, selecting the helmet 200 includes selecting a particular type of helmet adapted for a particular type of riding conditions. In the case of the helmet 200, selecting the helmet 200 includes selecting a high vision type helmet. The riding conditions for selecting the helmet 200 are generally different from the riding conditions for which the helmet 100 would be chosen. In the present case, the helmet 200 is not specifically adapted to cold weather riding.

In some embodiments, the method 400 further includes attaching the mask 350 to the helmet shell 10 in response to selecting the helmet 300 from the family 50 of helmets. In such cases, selecting the helmet 300 could include selecting a type of helmet adapted for another type of riding conditions, specifically for motocross style riding.

In response to selecting one of the helmets 200, 300, in some embodiments of the method 400, the vent blockers 23 are not connected to the helmet shell 10. The left and right jaw vent apertures 24 are left fluidly connected to the left and right jaw vents 26.

Figure 19:
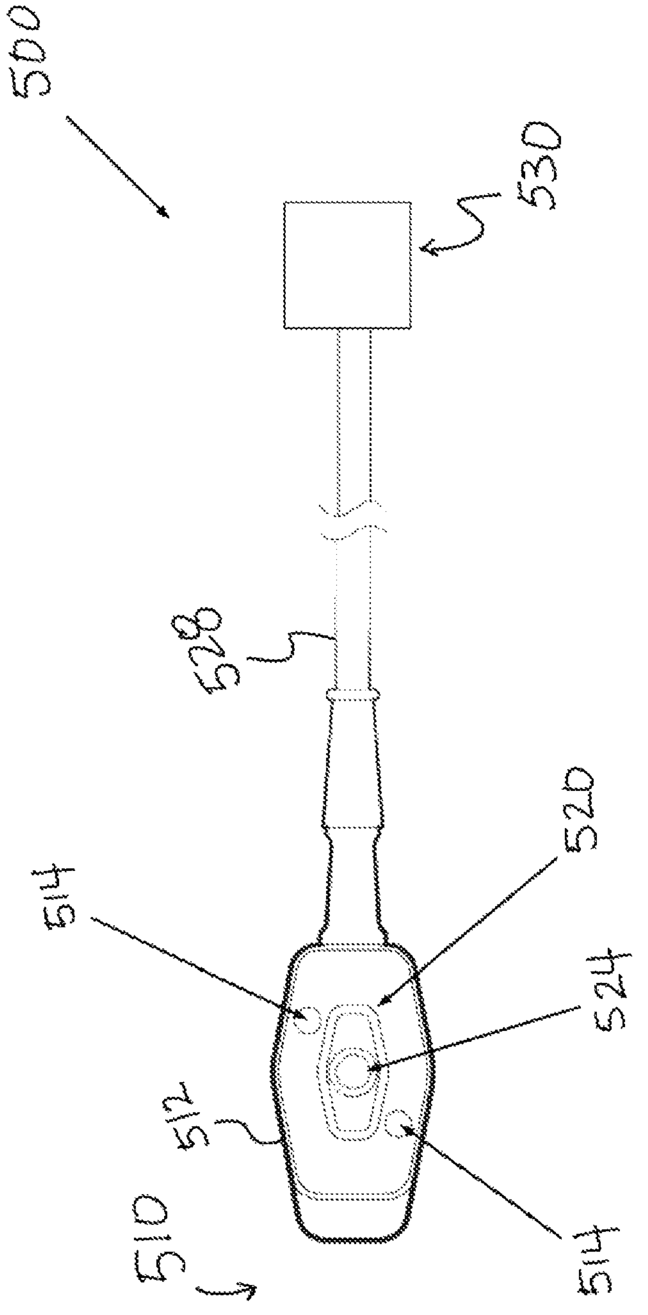
FIG. 19 is a top plan view of a power connector configured for selectively connecting to a helmet of the family of helmets of FIG. 1.
Figure 20:
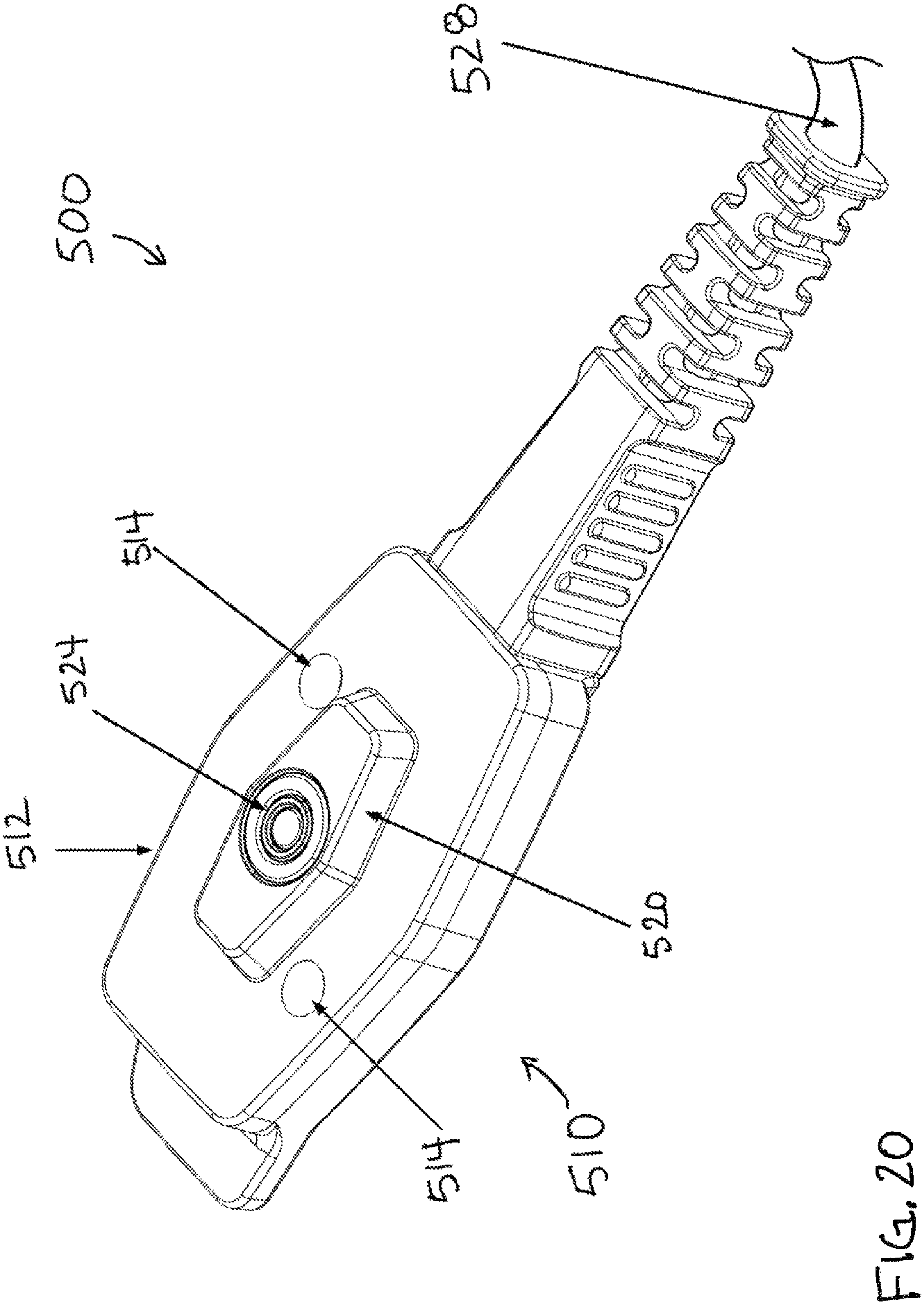
FIG. 20 is a perspective view of one end portion of the power connector of FIG. 19.
Figure 21:
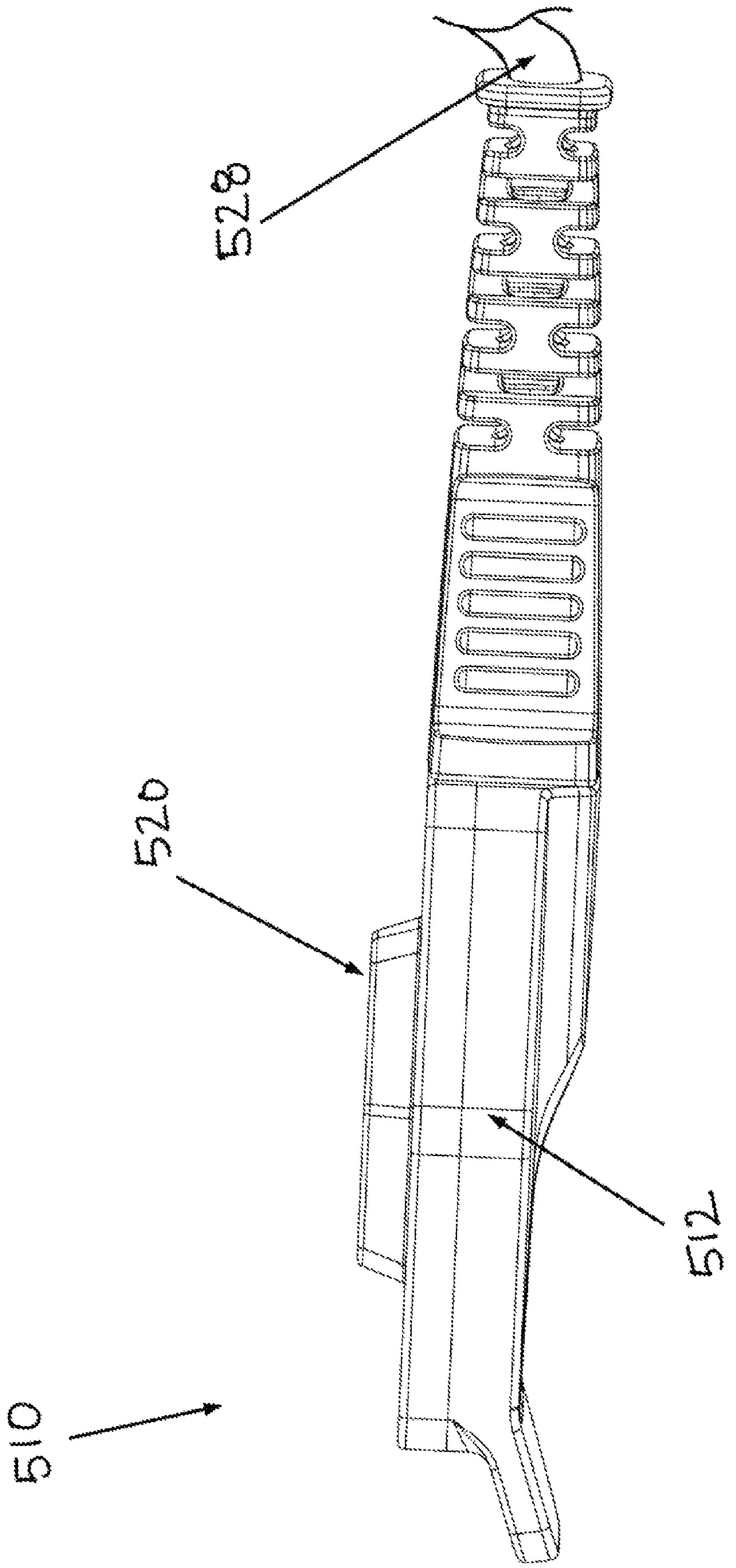
FIG. 21 is a side elevation view of the end portion of the power connector of FIG. 20.
Figure 23:
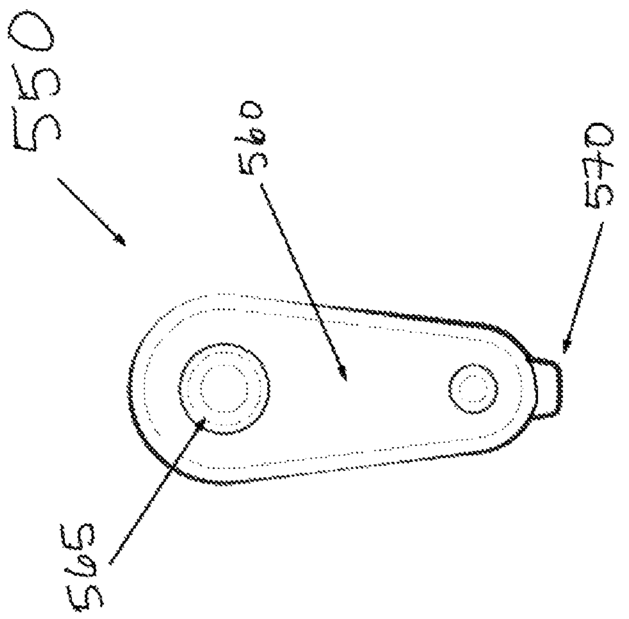
FIG. 23 is a rear elevation view of the storage fixation of FIG. 22.
Figure 22:
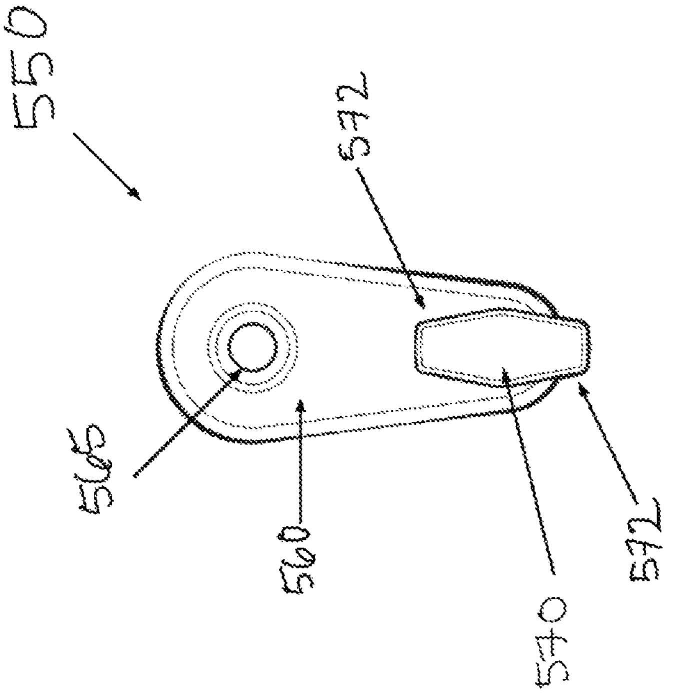
FIG. 22 is a front elevation view of a storage fixation for selectively storing a helmet of the family of helmets of FIG. 1.

The helmet shell 10, and as such each helmet 100, 200, 300, is further configured to be selectively connected to a power connector 500 for providing electrical power to the helmet 100, 200, 300. One non-limiting embodiment of the power connector 500 is illustrated in FIGS. 19 to 21. In addition to connecting to the helmet 100, 200, 300, the power connector 500 could be used, in some embodiments, for providing power to an alternative accessory. For example, the power connector 500 could be used to power, for example, an electrified garment or a tool, heated goggles, accessory light(s), and bags.

The power connector 500 includes a first end portion 510 configured for electrically connecting to the helmet shell 10 (or the accessory). The power connector 500 also includes a second, opposite end portion 530 electrically connected to the first end portion 510 for electrically connecting to a power source. Depending on the embodiment, the end portion 530 could be configured to electrically connect to different power sources, including but not limited to a vehicle (for example from the battery of the vehicle) and a wall outlet. A cord portion 528 of the connector 500 electrically connects to the end portions 510, 530 together. The particular form of the cord portion 528 could vary in different embodiments and is not meant to be particularly limited in the present technology.

The first end portion 510 includes a connector body 512. While the connector body 512 is generally hexagonally shaped, different forms are contemplated. The first end portion 510 includes two connector magnets 514 disposed on the connector body 512. The connector magnets 514 are configured and arranged to selectively magnetically connect one or more magnets of the accessory to which it is selectively connected. In the case of the helmet 100, 200, 300, the connector magnets 514 are positioned to align and selectively magnetically connect to the helmet magnets 72 adjacent to the aperture 45 of the helmet shell 10.

The connector 500 includes an anchor portion 520 connected to and extending from the connector body 512. The anchor portion 520 is shaped and sized to pass through the aperture 45 of the helmet shell 10 and to extend into the chamber 40.

The connector 500 also includes an electrical contact 524 disposed on the anchor portion 520. The electrical contact 524 includes a positive electrical contact and a negative electrical contact (not separately identified). The positive and negative electrical contacts are configured to connect to the corresponding electrical contacts 65 of the helmet shell 10.

The power connector 500 is configured to be selectively secured to the helmet 100, 200, 300 by aligning the connector magnets 514 with the helmet magnets 72, with the anchor portion 520 being thereby inserted into the chamber 40. The contact 524 is positioned on the anchor portion 520 such that when the connector 500 is connected to the helmet shell 10, the contact 524 electrically connects to the electrical contact 65.

With reference to FIGS. 22 to 26, each helmet 100, 200, 300 is further configured to be selectively connected to a storage fixation 550 for storing the helmet 100, 200, 300. Specifically, the helmet shell 10 is configured to be selectively connected to the fixation 550 using the chamber 40 defined in the rear of the helmet shell 10.

The storage fixation 550 is arranged for selectively receiving any of the helmets 100, 200, 300 thereon. While a particular aesthetic form is illustrated in the Figures, it is contemplated that the overall form of the storage fixation 550 could vary in different embodiments.

The storage fixation 550 includes a fixation body 560 configured to be connected to a generally flat surface. Depending on the use, the fixation body 560 could be connected to a vertically extending flat surface such as a wall, a storage container, etc. It is also contemplated that the fixation 550 could be connected to the vehicle or other accessory (such as a bag). A fastener aperture 565, specifically a through-hole 565, is defined in the fixation body 560 for receiving a fastener therethrough. When in use, the fastener is disposed through the fastener aperture 565 for connecting the storage fixation 550 to the generally flat surface.

The storage fixation 550 includes an anchor lock 570 connected to the body 560.

The anchor lock 570 is configured to be inserted through the aperture 45 of the helmet shell 10 and into the chamber 40. Specifically, the anchor lock 570 has a generally oblong hexagonal shape, formed to pass through the aperture 45. The anchor lock 570 is offset from the fastener aperture 565 and from a center of the fixation body 560. The anchor lock 570 could be more centrally located on the fixation body 560 in some embodiments. In at least some embodiments, it is contemplated that the anchor lock 570 could include electrical contacts configured to connect to a power source, similar to the contacts of the connector 500. In such an embodiment, the helmet 100, 200, 300 could be recharged during storage.

Figure 24A:
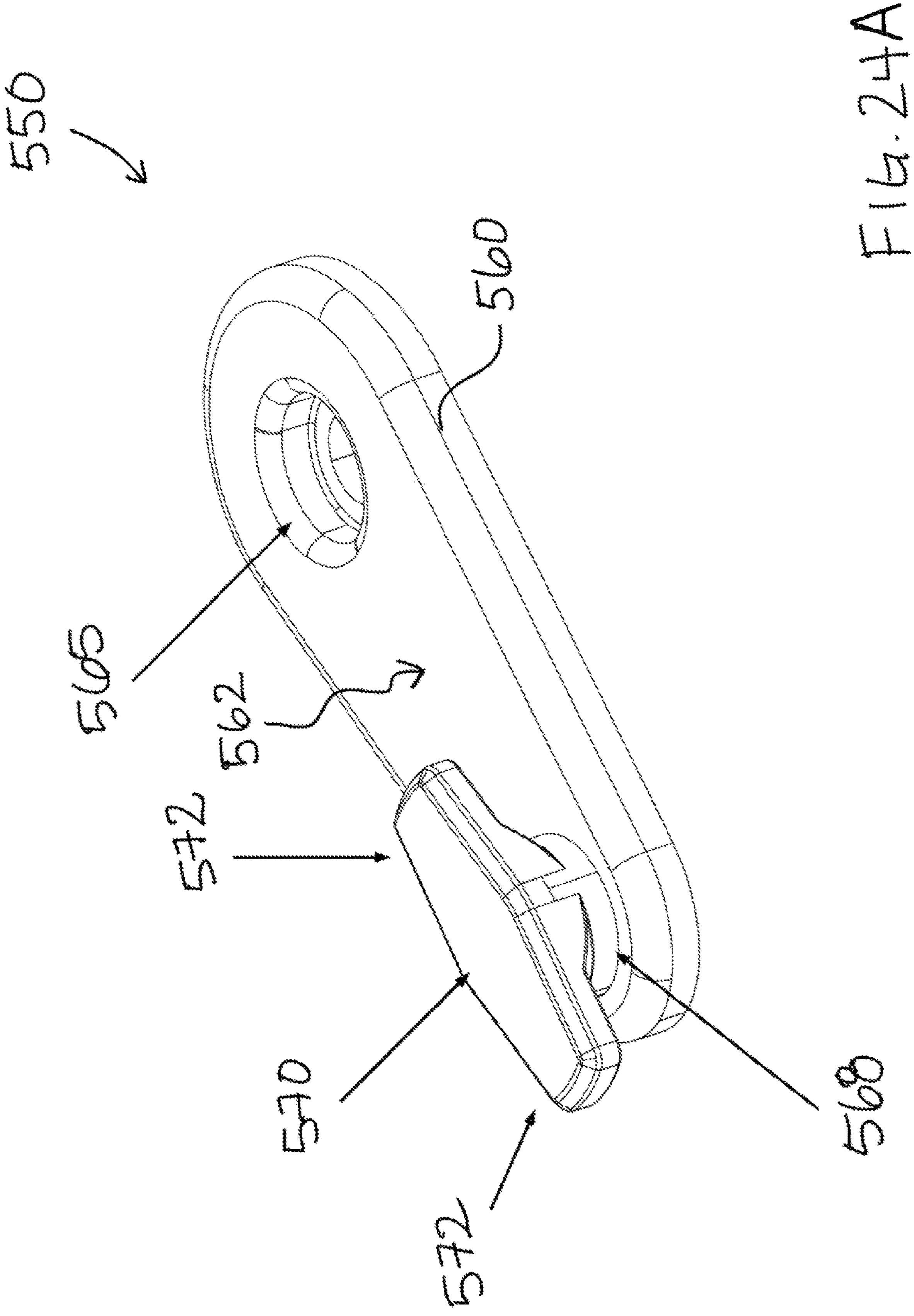
FIG. 24A is a front, left perspective view of the storage fixation of FIG. 22.
Figure 24B:
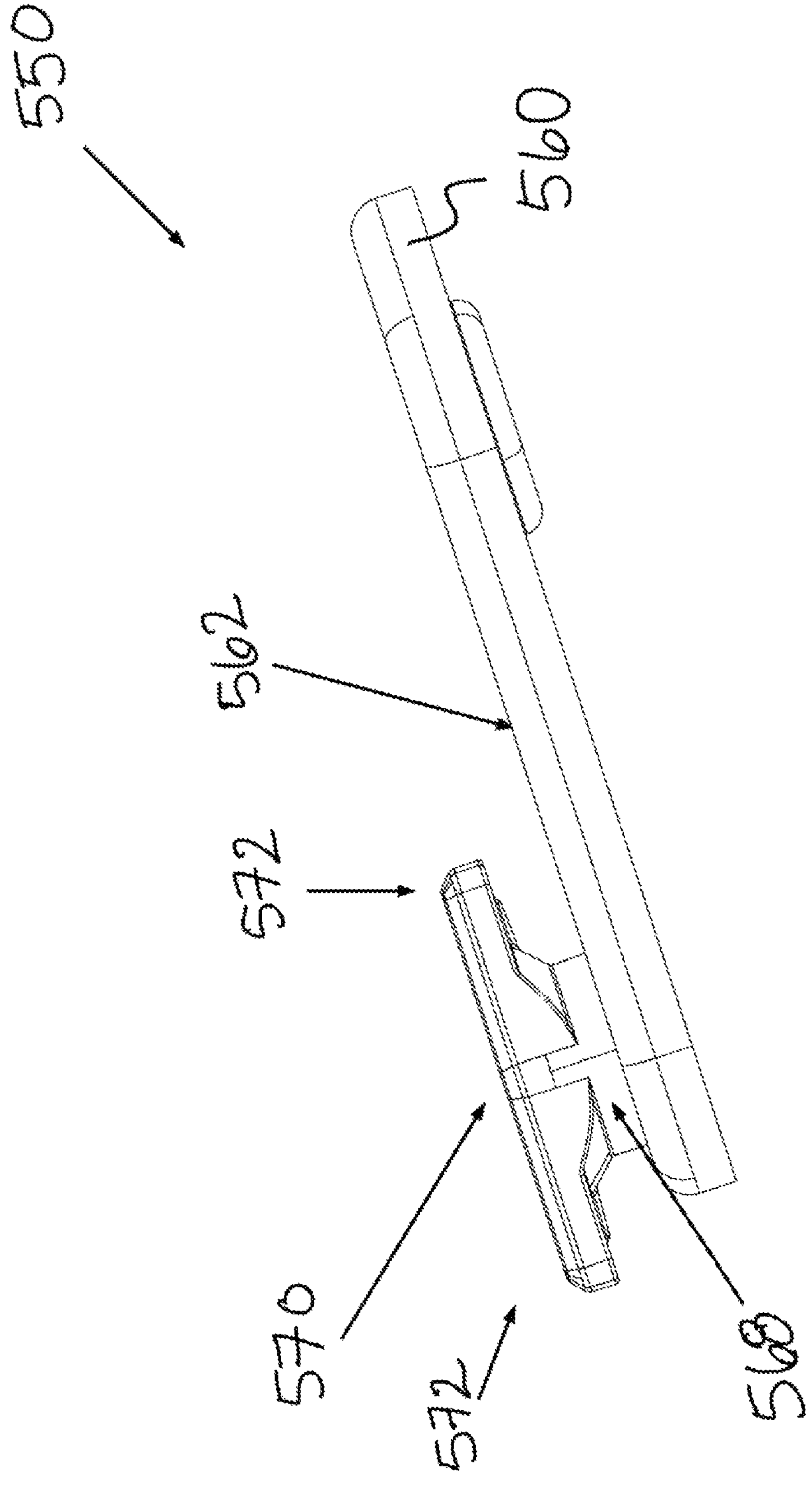
FIG. 24B is a left side elevation view of the storage fixation of FIG. 22.

As can be seen in FIGS. 24A and 24B, the storage fixation 550 includes a stem 568 extending from the fixture body 560, specifically from a surface 562 of the body 560. The anchor lock 570 extends from the stem 568 and is connected to the fixture body 560 therethrough. The anchor lock 570 is thus spaced from the surface 562. As this will be described further below, space between the anchor lock 570 and the surface 562 permits rotation of the aperture 45 about the anchor lock 570.

The anchor lock 570 includes two cams 572 extending from opposite sides of the stem 568. Each cam 572 has a generally trapezoidal shape, such that the oppositely disposed cams 572 together form the generally hexagonal shape of the anchor 570. As can be seen from FIG. 22, when the storage fixation 550 is connected to a vertically extending flat surface, the two cams 572 extend generally vertically from the stem 568.

Figure 25:
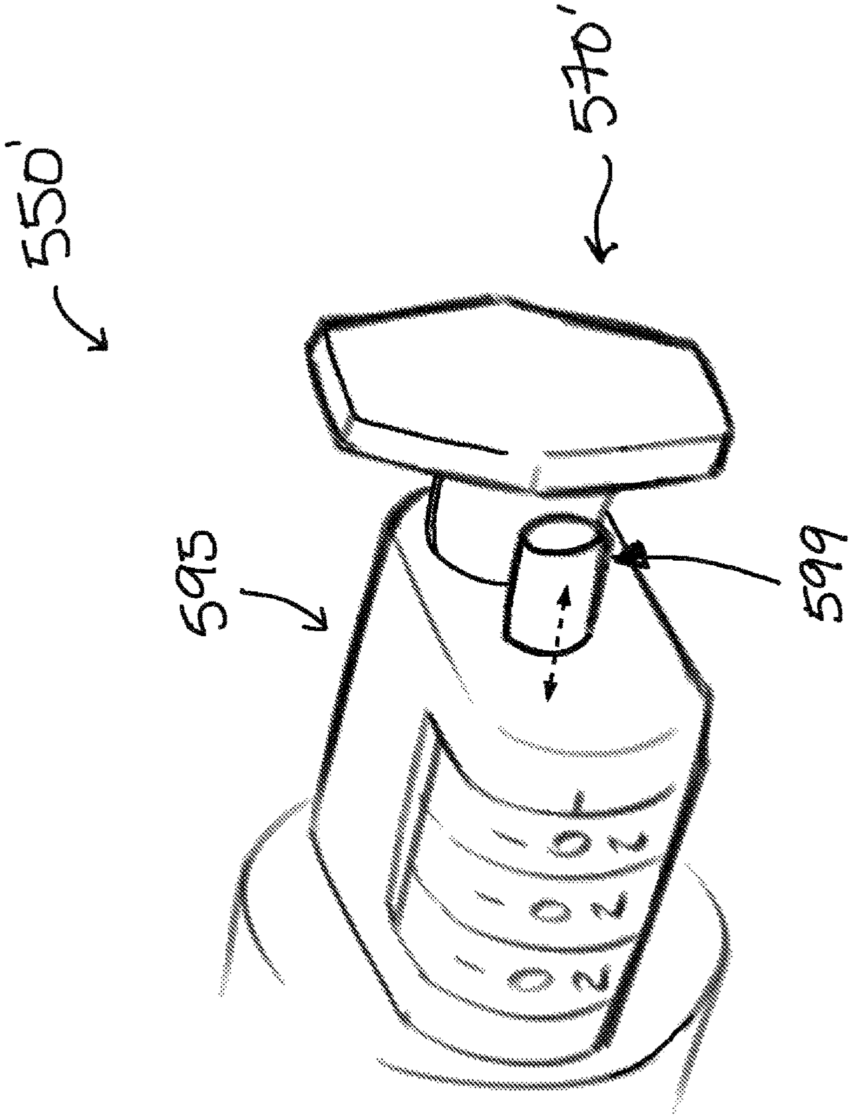
FIG. 25 is a perspective, partial view of a storage fixation according to another non-limiting embodiment.

In some embodiments of a fixation, such as the non-limiting embodiment of a storage fixation 500' illustrated in FIG. 25, additional locking features could be included. The fixation 550' includes a lock 595 with a locking pin 599. When the lock 595 is opened, either by code as shown or by a key (not shown), the locking pin 599 is retracted into the lock 595 to permit movement of any of the helmets 100, 200, 300 relative to the fixation 550' (described in more detail below). The helmet shell 10', illustrated in FIG. 8, includes the locking pin aperture 69 in which the locking pin 599 is selectively received when the pin 599 is extended. The pin 599 is biased to the retracted position (not shown), but different arrangements are contemplated.

The storage fixation 550 or 550' selectively receives the helmet shell 10, and thus any of the helmets 100, 200, 300, for selectively storing the corresponding helmet 100, 200, 300. When the helmet shell 10 is positioned relative to the storage fixation 550 such that the anchor lock 570 is received in the chamber 40, the helmet shell 10 is rotatable relative to the anchor lock 570 between an unlocked position and a locked position.

In the unlocked position (not shown), the anchor lock 570 is free to pass through the anchor aperture 45. The helmet shell 10 is thus selectively removeable from the storage fixation 550 in this position, specifically by moving the helmet shell 10 such that the anchor lock 570 exits the chamber 40 through the aperture 45. In the locked position (FIG. 26), the anchor lock 570 is disposed in the chamber 40 and is prevented by the helmet shell 10 (specifically the trim portion 16) from passing through the aperture 45. Specifically, the anchor lock 570 is oriented in the chamber 40 perpendicular to the aperture 45, in a quarter-turn arrangement.

In order to move between the unlocked position and the locked position, the helmet shell 10 is rotated or pivoted to move the anchor aperture 45 relative to the anchor lock 570. Each quarter turn of the helmet shell 10 relative to the anchor lock 570 switches between the locked and unlocked positions, or vice versa. The helmet shell 10 is then selectively secured to the storage fixation 550 by inserting the anchor lock 570 into the chamber 40 by moving the helmet shell 10 relative to the storage fixation 550 and then rotating the helmet shell 10 to place the anchor lock 570 in the locked position.

Figure 26:
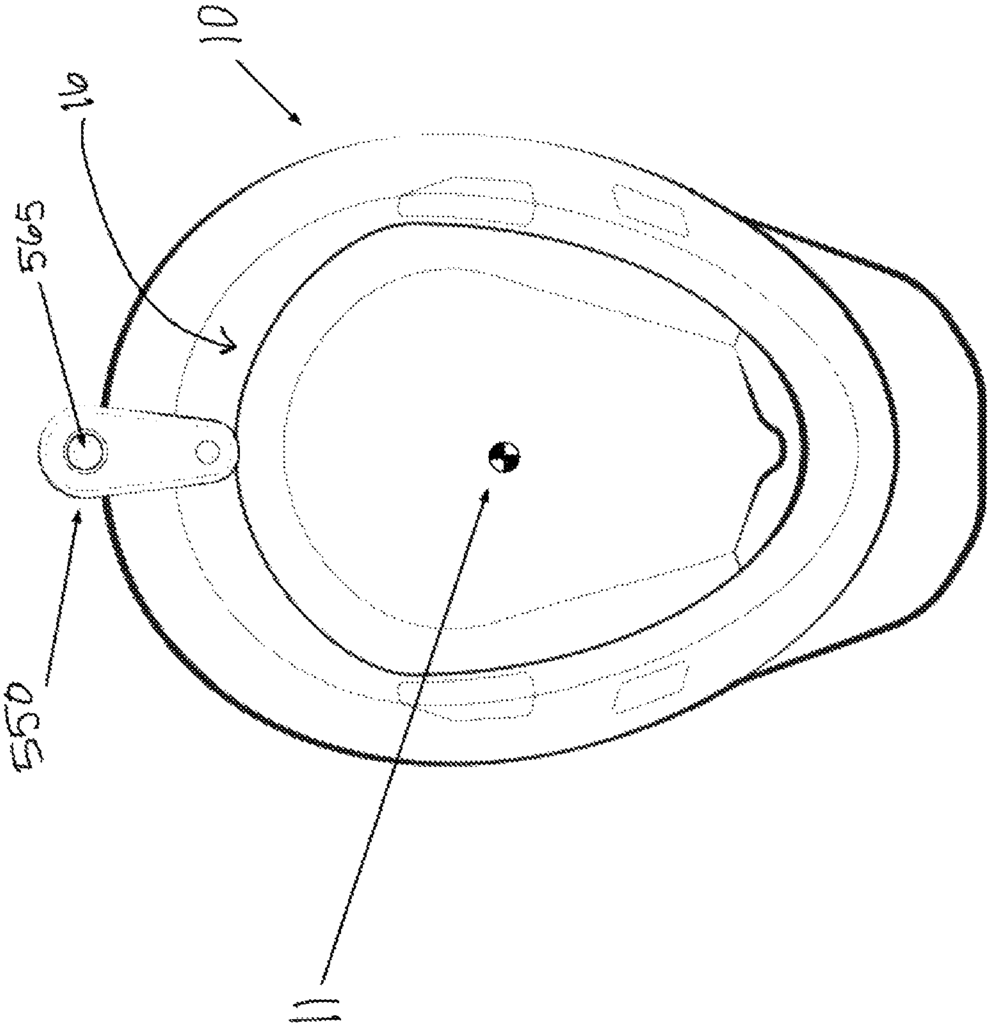
FIG. 26 is a rear elevation view of the storage fixation of FIG. 22, with the helmet shell of FIG. 4 illustrated as connected thereto.
Figure 27:
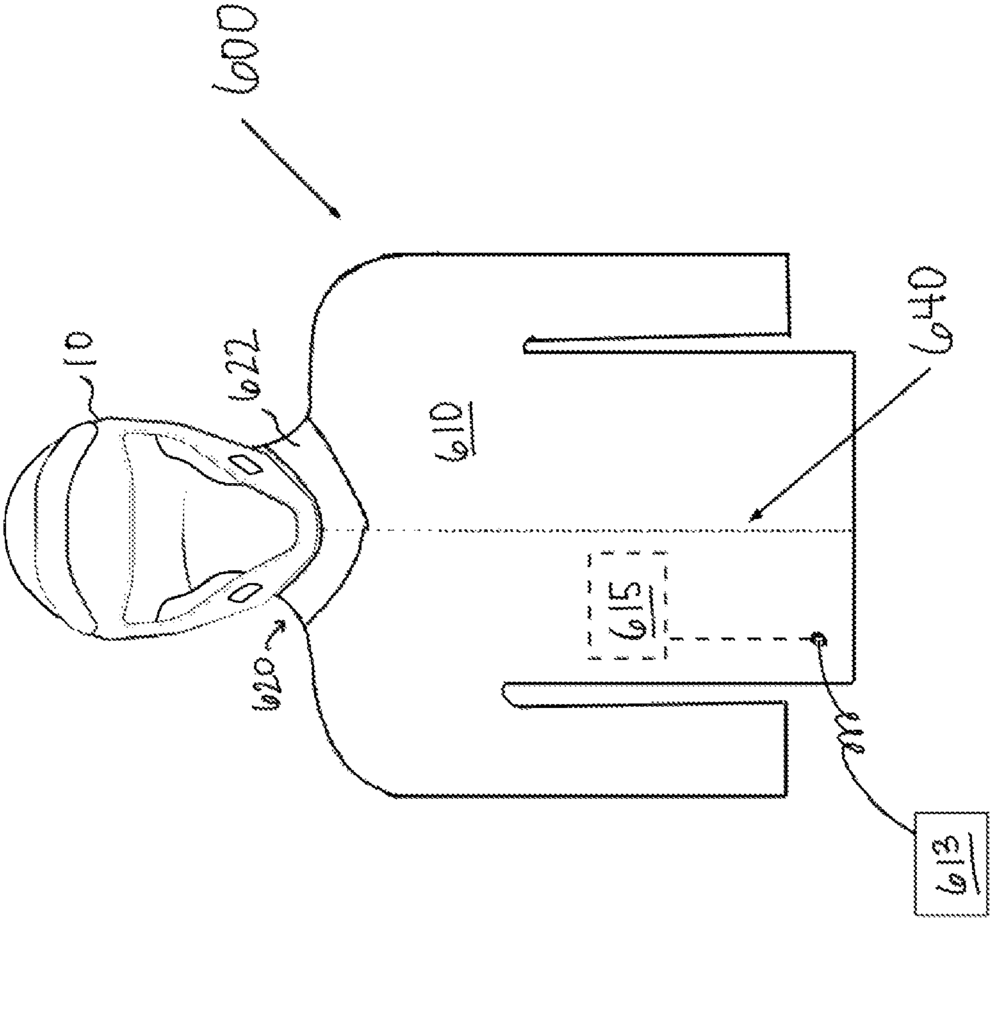
FIG. 27 is a front elevation view of an electrified garment according to non-limiting embodiments of the present technology, with the helmet shell of FIG. 4 illustrated as connected thereto.
Figure 28:
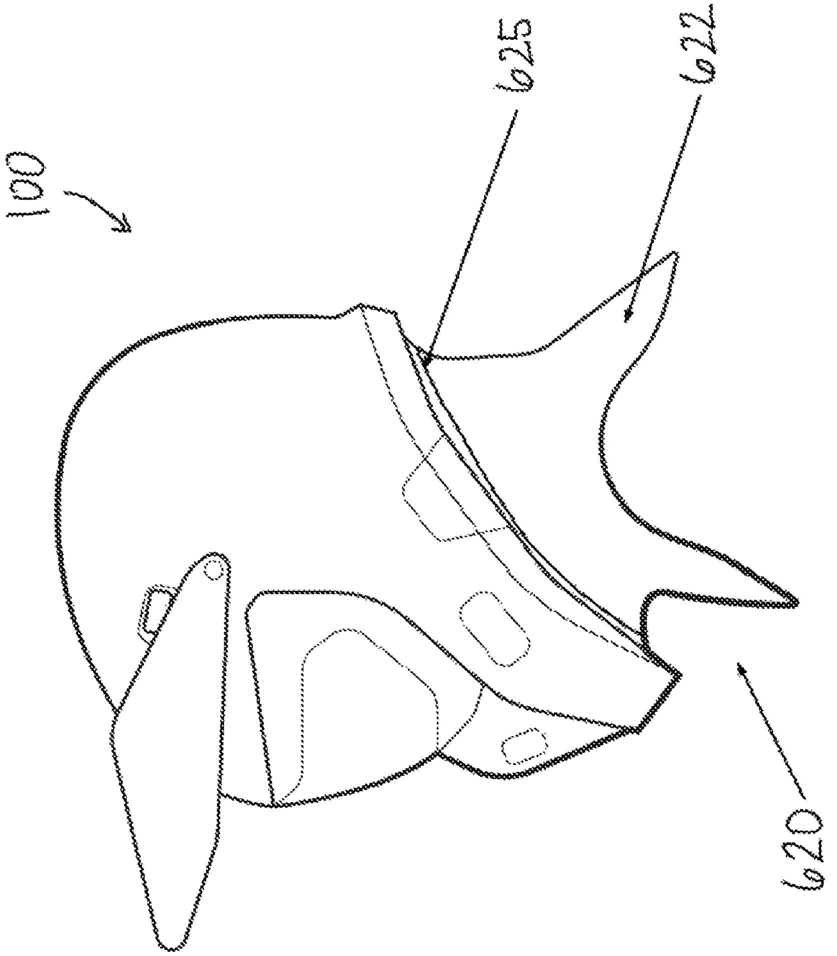
FIG. 28 is a left side elevation view of a portion of the electrified garment of FIG. 27, with the helmet of FIG. 10 illustrated as connected thereto.

The chamber 40, disposed in a rear portion of the helmet shell 10, is offset from a center of gravity 11 of the helmet shell 10. As can be seen in FIG. 26, when the helmet shell 10 is selectively connected to the storage fixation 550 and the helmet shell 10 is oriented in the locked position, the helmet shell 10 is in a gravitationally stable position. Specifically, as the longer dimension 46 the aperture 45 extends along right-left lateral directions relative to the helmet shell 10 and a longer dimension of the anchor lock 570 extends generally vertically, in the locked position a forward portion of the helmet shell 10 is oriented generally downward. In this position, the center of gravity 11 is below the pivoting action of the aperture 45 relative to the anchor lock 570. The helmet shell 10 is thus maintained in the locked position on the storage fixation 550 by gravity. The helmet shell 10 is thus also biased toward the locked position by gravity when oriented in a position intermediate the unlocked position and the locked position.

While it is contemplated that the connector aperture 45 and the chamber 40 could defined at locations other than the rear or front bottom surfaces on the shell 10, it is noted that the anchoring and gravitationally stable position would not necessarily function equivalently in such an arrangement. It is also contemplated that the anchor lock 570 could be arranged as a "T"-hook system, such that the helmet shell 10 is connected to the fixation 550 without rotation.

Each helmet 100, 200, 300 is further configured to be selectively connected to a garment 600. In at least some embodiments, each helmet 100, 200, 300 is provided electrical power from the garment 600 when the helmet 100, 200, 300 and the garment 600 are worn by the wearer. In some embodiments, the helmet 100, 200, 300 selectively connects to the garment 600 around a circumference of the helmet 100, 200, 300 to impede air flow between the garment 600 and the helmet 100, 200, 300 when worn.

With reference to FIGS. 27 to 31, the garment 600 is specifically an electrified garment 600, more specifically an electrified jacket 600 in the illustrated embodiment. In other embodiments, the garment 600 could be differently implemented in various forms, including but not limited to: a neck roll, a hair management pocket, and a neck brace-style garment. The garment 600 is configured and arranged to selectively electrically connect to the helmet shell 10, thus to any one of the helmets 100, 200, 300 as described above. Connection of the helmet 100, 200, 300 to the garment 600 is described in more detail below.

The garment 600 includes a garment body 610 for receiving a torso of the wearer. In the illustrated example, the garment body 610 is schematically shown with a standard jacket style form (torso portion with sleeves connected thereto) although different functional and aesthetic forms are contemplated. The garment body 610 is formed from one or more flexible fabric materials, although the particular choice of materials is also not meant to be limiting. For instance, material layers having insulating and/or water-resistant properties are contemplated.

The garment 600 includes a collar portion 620 connected to and extending from the garment body 610. The collar portion 620 includes a collar body 622 for at least partially covering a neck of the wearer. The collar body 622 is formed from one or more flexible fabric materials. Depending on the embodiment, the collar body 622 could be formed from the same or different materials than the garment body.

The collar portion 620 also includes a trim portion 625 connected to the collar body 622, specifically to a top edge thereof. The trim portion 625 is formed from a semi-rigid or rigid material, including but not limited to: nylon, rubber and semi-rigid plastic composites. The trim portion 625 extends around an entirety of the collar portion 620 to form a closed perimeter of the neck of the wearer when the garment 600 is worn and closed (described further below).

Figure 30:
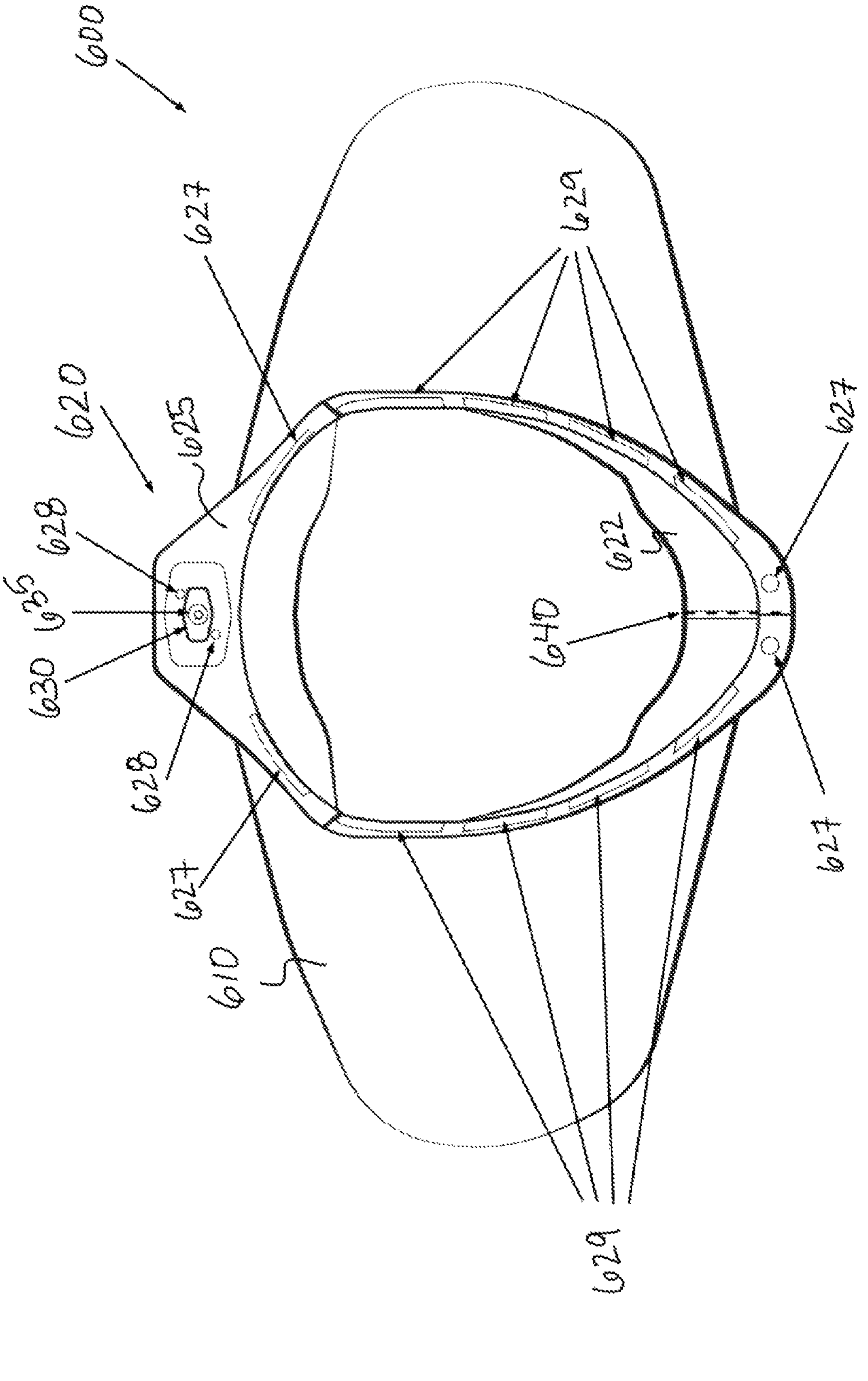
FIG. 30 is a top plan view of the electrified garment of FIG. 27, with a fastener of the garment being in a closed position.
Figure 31:
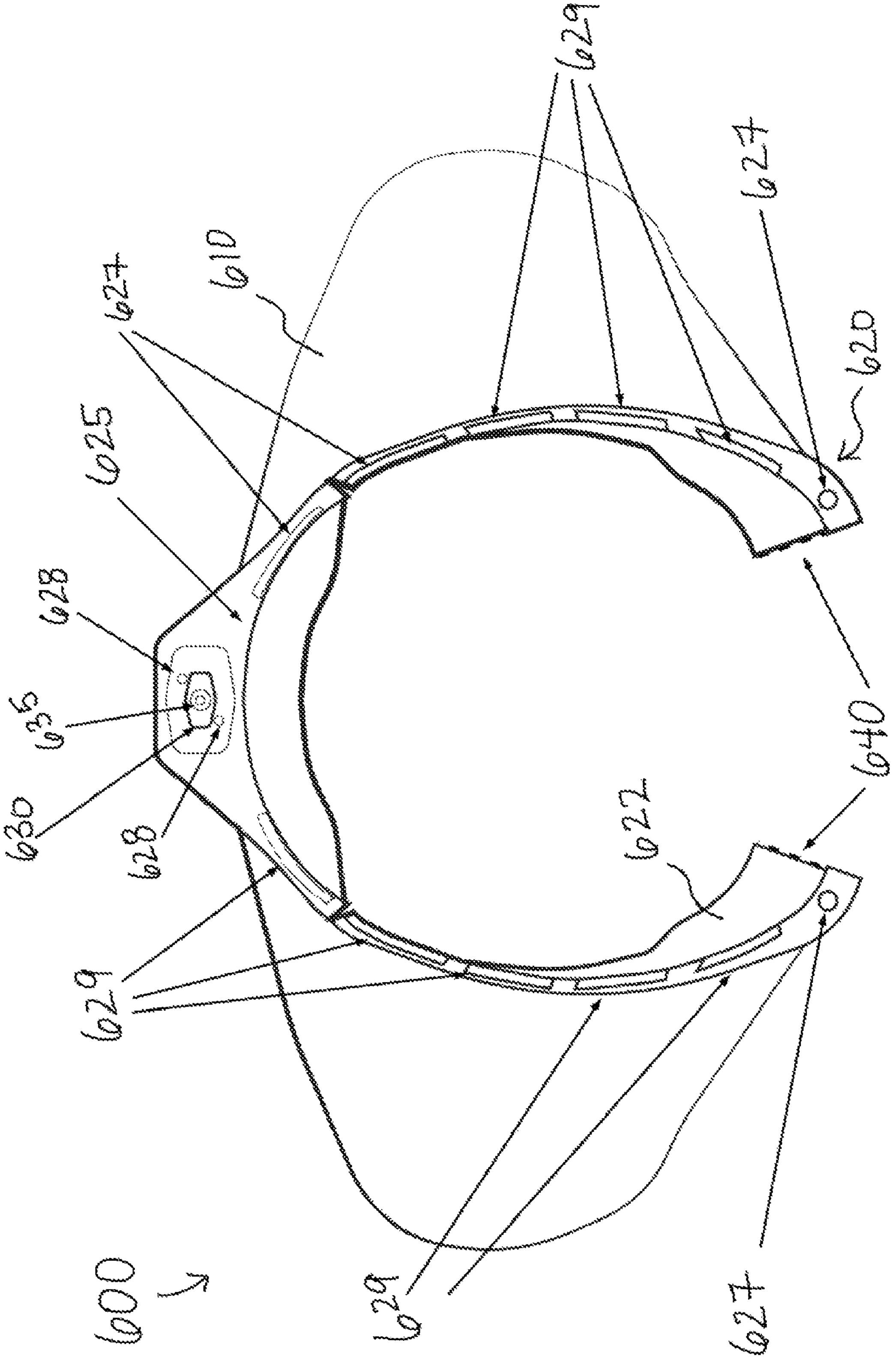
FIG. 31 is the top plan view of the electrified garment of FIG. 30, with the fastener being in an open position.

The garment 600 further includes one or more garment magnets 627 disposed in the trim portion 625. As is illustrated in FIGS. 30 and 31, the present embodiment includes two garment magnets 627 disposed in a front part of the trim portion 625. When in use, and as will be described in more detail below, the garment magnets 627 are arranged and configured to selectively magnetically connect to the helmet magnets 90 to bring the trim portion 625 into contact with the helmet 100, 200, 300. The trim portion 625 further includes a series of tabs 629 (shown schematically) for connecting into the slots 91 of the helmet shell 10.

The garment 600 further includes a collar anchor portion 630 extending generally upward from the trim portion 625. The collar anchor portion 630 is shaped for insertion into the chamber 40 defined in the helmet shell 10 (and thus in each helmet 100, 200, 300), also referred to as a connector chamber 40.

Figure 29:
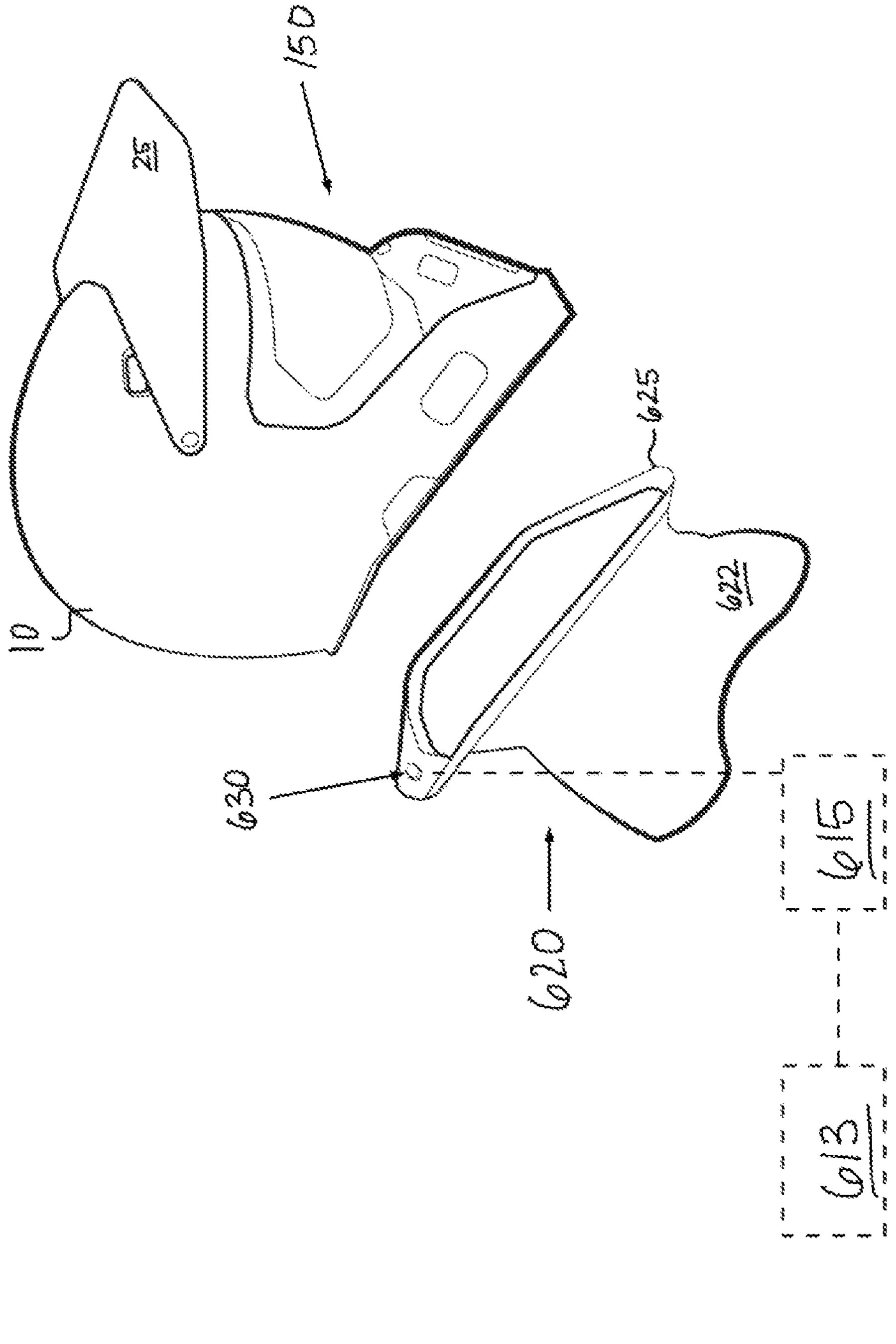
FIG. 29 is a perspective view taken from a top, right side of the portion of the electrified garment of FIG. 28, with the helmet of FIG. 10 illustrated as oriented for connection thereto and spaced therefrom.

As can be seen in FIG. 29, the collar anchor portion 630 is connected the trim portion 625, with the collar anchor portion 630 being spaced from the trim portion 625. The collar anchor portion 630 is generally oblong hexagonal shaped and is sized and shaped to match the aperture 45 of the helmet shell 10. The collar anchor portion 630 is similarly shaped to the anchor 520 of the power connector 500, with the collar anchor portion 630 being arranged to be inserted into the chamber 40 through the aperture 45 in the helmet shell 10 without being rotated.

Similarly to the anchor 520 of the power connector 500, the collar anchor portion 630 is maintained in the chamber 40 by the magnets 72 of the helmet shell 10 and corresponding magnets 628 on the garment 600. The trim portion 625 includes two magnets 628 disposed adjacent to the collar anchor portion 630, the two magnets 628 being positioned on opposite sides of the collar anchor portion 630. When inserting the collar anchor portion 630 into the chamber 40 of the helmet shell 10, the magnets 628 selectively connect to the magnets 72.

The collar anchor portion 630 includes a garment electrical contact 635 disposed thereon. The garment electrical contact 635 includes a positive electrical contact and a negative electrical contact (not separately identified). The positive and electrical contacts 635 are arranged to connect to the corresponding contacts 65 of the helmet shell 10, when the collar anchor portion 630 is inserted into the chamber 40.

The garment body 610 is configured for connecting to a power source to power the garment electrical contact 635 and/or electrical components of the garment 600. In the illustrated embodiment, the garment 600 includes a tether and plug 613 (shown schematically) for selectively connecting to a power source, such as a vehicle ridden by the wearer. The garment electrical contact 635 is provided with electricity from the power source, via the garment body 610. In at least some embodiments, the collar portion 620 could be configured for connecting to a power source, in addition or alternatively to the garment body 610. In some embodiments, the garment 600 could further include a battery for providing power via the garment electrical contact 635. In such a case, the plug 613 may or may not be omitted.

The garment 600 includes to an electrical system 615 (shown schematically) in the garment body 610 of the jacket 600. As is illustrated schematically, the electrical system 615 is electrically connected to the tether and plug 613. The electrical system 615 includes a heating element (not shown) which heats the garment 600 when with provided power from the vehicle. It is contemplated that the garment 600 could include additional or different electrical elements, including, but not limited to: one or more connections for supplying power to secondary garments, one or more connectors for providing power to electronic devices and one or more batteries for storing power provided from the vehicle.

The garment 600 includes a garment fastener 640 for selectively opening a portion of the garment 600. The garment fastener 640 specifically extends from the trim portion 625, through the collar body 622, to a bottom edge of the garment body 610. The garment fastener 640 thus serves to selectively open the trim portion 625, the collar body 622, and the garment body 610 (see FIG. 31). In some embodiments, it is contemplated that the garment fastener 640 could extend through the trim portion 625, and some or all of the collar portion 620, without extending through an entirety of the garment body 610. The garment fastener 640 in the present embodiment is a zipper 640 connected to the collar portion 320 and the garment body 610. Other embodiments of fasteners are contemplated.

When in use, with the garment 600 and one of the helmets 100, 200, 300 being worn by the wearer, the garment magnets 627 selectively connect to the helmet magnets 90 and the tabs 629 are inserted into the slots 91 to bring the trim portion 625 into contact with the helmet 100, 200, 300 and to enclose the neck of the wearer. The connection between the garment 600 and the helmet 100, 200, 300 then generally creates a seal therebetween to impede the flow of air and/or debris therebetween. In at least some embodiments, the magnets could be omitted and the helmet shell 10 and the garment 600 are selectively connected simply through the mechanical means of the tabs 629 and slots 91.

When the garment 600 and one of the helmets 100, 200, 300 is worn by the wearer and the trim portion 625 is in contact with the helmet shell 10, the collar anchor portion 630 is inserted and disposed in the chamber 40 of the helmet shell 10. The garment electrical contact 635 is then electrically connected to the electrical contact 65 of the helmet shell 10. The helmet 100, 200, 300 may then receive electrical power for powering the helmet 100, 200, 300 from the garment 600.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A helmet comprising:

a helmet shell for receiving a head of a wearer, the helmet shell defining therein:

a connector chamber, and a connector aperture opening into the connector chamber;

at least one electrical device attached to the helmet shell;

at least one electrical contact disposed in the connector chamber, the at least one electrical contact being electrically connected to the at least one electrical device, the at least one electrical contact being adapted for electrically coupling to a helmet power connector, the helmet power connector being configured for electrically connecting to a power source, the connector chamber being shaped and configured to receive therein an anchor portion of the helmet power connector; and at least one magnet disposed on the helmet shell in a vicinity of the connector aperture, the at least one magnet being configured to selectively magnetically connect at least one connector magnet of the helmet power connector, the helmet being configured to selectively secure the helmet power connector thereto by aligning the at least one magnet of the helmet shell with the at least one connector magnet of the helmet power connector and receiving the anchor portion of the helmet power connector in the connector chamber, when in use with the helmet shell receiving the anchor portion of the helmet power connector in the connector chamber, the at least one electrical contact being electrically coupled to at least one power electrical contactor disposed on the anchor portion, an electrical connection location between the helmet and the helmet power connector being disposed within the connector chamber and at least partially surrounded by the helmet shell, wherein:

the helmet is further adapted for selectively connecting to a storage fixation comprising an anchor lock;

the connector chamber is further configured to receive the anchor lock therein;

the connector aperture is further configured to selectively permit passage of the anchor lock therethrough;

when the helmet is positioned such that the anchor lock is received in the connector chamber, the helmet is rotatable relative to the storage fixation between an unlocked position and a locked position, in the unlocked position, the connector aperture being free to pass over the anchor lock, the helmet being selectively removeable from the storage fixation in the unlocked position, in the locked position, the anchor lock being disposed in the connector chamber and being prevented by the helmet shell from passing through the connector aperture; and the helmet is rotated to move the connector aperture relative to the anchor lock between the unlocked position and the locked position.

2. The helmet of claim 1, wherein the power source is a battery for a vehicle.

3. The helmet of claim 1, wherein:

the helmet shell includes:

a crown portion, and a bottom trim disposed opposite the crown portion;

the connector aperture is defined in a bottom surface of the bottom trim; and the connector chamber is defined at least partially in the bottom trim.

4. The helmet of claim 1, wherein:

a first dimension of the connector aperture extends along a left-right axis of the helmet shell;

a second dimension of the connector aperture extends along a forward-rearward axis of the helmet shell, the second dimension being orthogonal to the first dimension; and the first dimension is greater than the second dimension.

5. The helmet of claim 1, wherein the at least one electrical contact includes:

a positive electrical contact configured to connect to a positive connector contact of the helmet power connector, and a negative electrical contact configured to connect to a negative connector contact of the helmet power connector.

6. The helmet of claim 1, wherein the helmet is selectively secured to the storage fixation by inserting the anchor lock into the connector chamber by moving the helmet relative to the storage fixation and rotating the helmet to the locked position.

7. The helmet of claim 1, wherein, when the helmet is selectively connected to the storage fixation and the helmet is oriented in the locked position, the helmet is in a gravitationally stable position.

8. The helmet of claim 7, wherein the helmet moves between the locked position and the unlocked position by pivoting about the anchor lock of the storage fixation.

9. The helmet of claim 1, wherein:

the connector chamber is laterally offset from a center of gravity of the helmet; and when the anchor lock is selectively inserted into the connector chamber and the helmet is oriented in a position intermediate the unlocked position and the locked position, the helmet is biased toward the locked position by gravity.

10. The helmet of claim 1, wherein:

the helmet shell includes:

a crown portion, and a bottom trim disposed opposite the crown portion;

the connector aperture is defined in a bottom surface of the bottom trim; and the connector chamber is defined at least partially in the bottom trim.

11. The helmet of claim 10, wherein the connector chamber is disposed in a rear portion of the helmet shell.

12. The helmet of claim 1, wherein:

the helmet is further adapted for selectively connecting to a garment for selectively receiving electrical power therefrom, the connector chamber being adapted to receive therein a collar anchor portion extending from a collar portion of a garment, the garment including the helmet power connector.

* * * * *